United States Patent
Ignarra

(10) Patent No.: US 10,946,913 B2
(45) Date of Patent: Mar. 16, 2021

(54) FENDER-TO-GRILLE TURN SIGNAL RELOCATION KIT

(71) Applicant: Paramount Restyling Automotive Inc., Ontario, CA (US)

(72) Inventor: Ricardo Santiago Ignarra, Ontario, CA (US)

(73) Assignee: Paramount Restyling Automotive Inc., Ontario, CA (US)

( * ) Notice: Subject to any disclaimer, the term of this patent is extended or adjusted under 35 U.S.C. 154(b) by 0 days.

(21) Appl. No.: 16/365,071

(22) Filed: Mar. 26, 2019

(65) Prior Publication Data

US 2019/0291798 A1  Sep. 26, 2019

Related U.S. Application Data

(60) Provisional application No. 62/647,999, filed on Mar. 26, 2018.

(51) Int. Cl.
| | | |
|---|---|---|
| *B62D 65/16* | (2006.01) | |
| *B60Q 1/34* | (2006.01) | |
| *F21S 43/20* | (2018.01) | |
| *B60Q 1/26* | (2006.01) | |

(52) U.S. Cl.
CPC .......... *B62D 65/16* (2013.01); *B60Q 1/2626* (2013.01); *B60Q 1/34* (2013.01); *F21S 43/26* (2018.01); *B60Q 2900/10* (2013.01)

(58) Field of Classification Search
CPC ....... B62D 65/16; F21S 43/26; B60Q 1/2626; B60Q 1/34
USPC .................................................... 362/540
See application file for complete search history.

(56) References Cited

U.S. PATENT DOCUMENTS

| | | | | |
|---|---|---|---|---|
| 1,422,732 A * | 7/1922 | Dixon | .................... | B60Q 1/124 362/46 |
| 3,582,640 A * | 6/1971 | Ellard | .................. | B60Q 1/2615 362/493 |
| 3,592,430 A * | 7/1971 | Coombs | ............... | B60Q 1/0483 362/549 |
| 4,860,174 A * | 8/1989 | Kato | .................... | B60Q 1/2607 362/510 |
| 4,954,932 A * | 9/1990 | Isenga | ..................... | B63B 45/02 362/477 |
| 5,924,790 A * | 7/1999 | Ponton | .................. | B60Q 1/2626 362/365 |
| 6,190,030 B1 * | 2/2001 | Chase | .................. | B60Q 1/0458 362/549 |

(Continued)

*Primary Examiner* — Bryon T Gyllstrom
(74) *Attorney, Agent, or Firm* — Myers Andras LLP; Joseph C. Andras

(57) ABSTRACT

An aftermarket vehicle turn signal assembly and a method of retrofitting the turn signal assembly to a grille of a vehicle are disclosed. The turn signal assembly enables users to customize their vehicles by repositioning a turn signal from a factory original fender location, for example, to an aftermarket opening formed on the grille. Using special drill templates designed for a specific vehicle, a user can locate a position for a hole, and later drill a hole into the grille of a vehicle. A user can then insert an aftermarket turn signal assembly into the hole, and secure the turn signal assembly to the grill. The user can then remove the factory original turn signal light source from the original fender location, and place the light source within the aftermarket turn signal assembly.

22 Claims, 25 Drawing Sheets

(56) References Cited

U.S. PATENT DOCUMENTS

| | | | |
|---|---|---|---|
| 2001/0046140 A1* | 11/2001 | Chase | B60Q 1/0491 362/549 |
| 2005/0094409 A1* | 5/2005 | Elwell | B60Q 1/2661 362/496 |
| 2013/0335991 A1* | 12/2013 | Proepper | F21S 43/51 362/549 |
| 2018/0170247 A1* | 6/2018 | Ramos, II | B60Q 1/0041 |
| 2019/0291798 A1* | 9/2019 | Ignarra | B62D 65/16 |

* cited by examiner

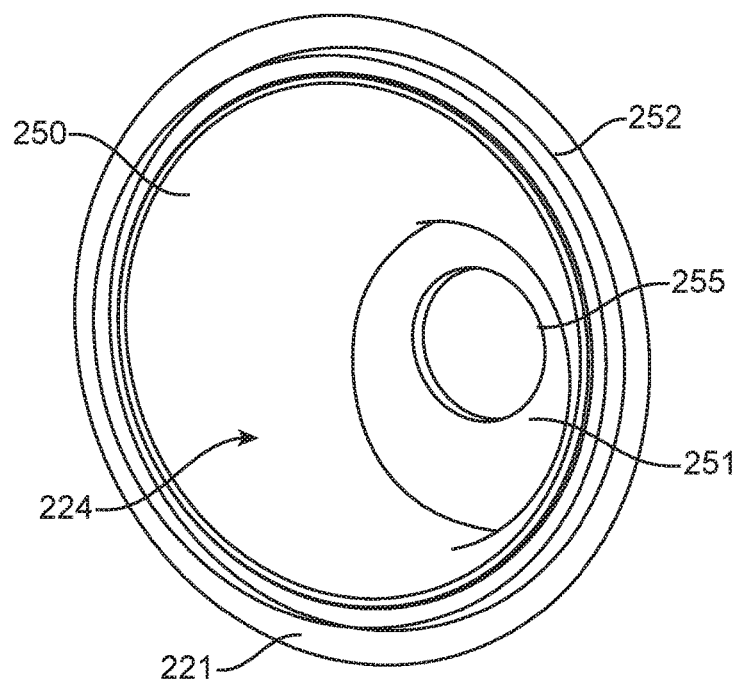
FIG. 14
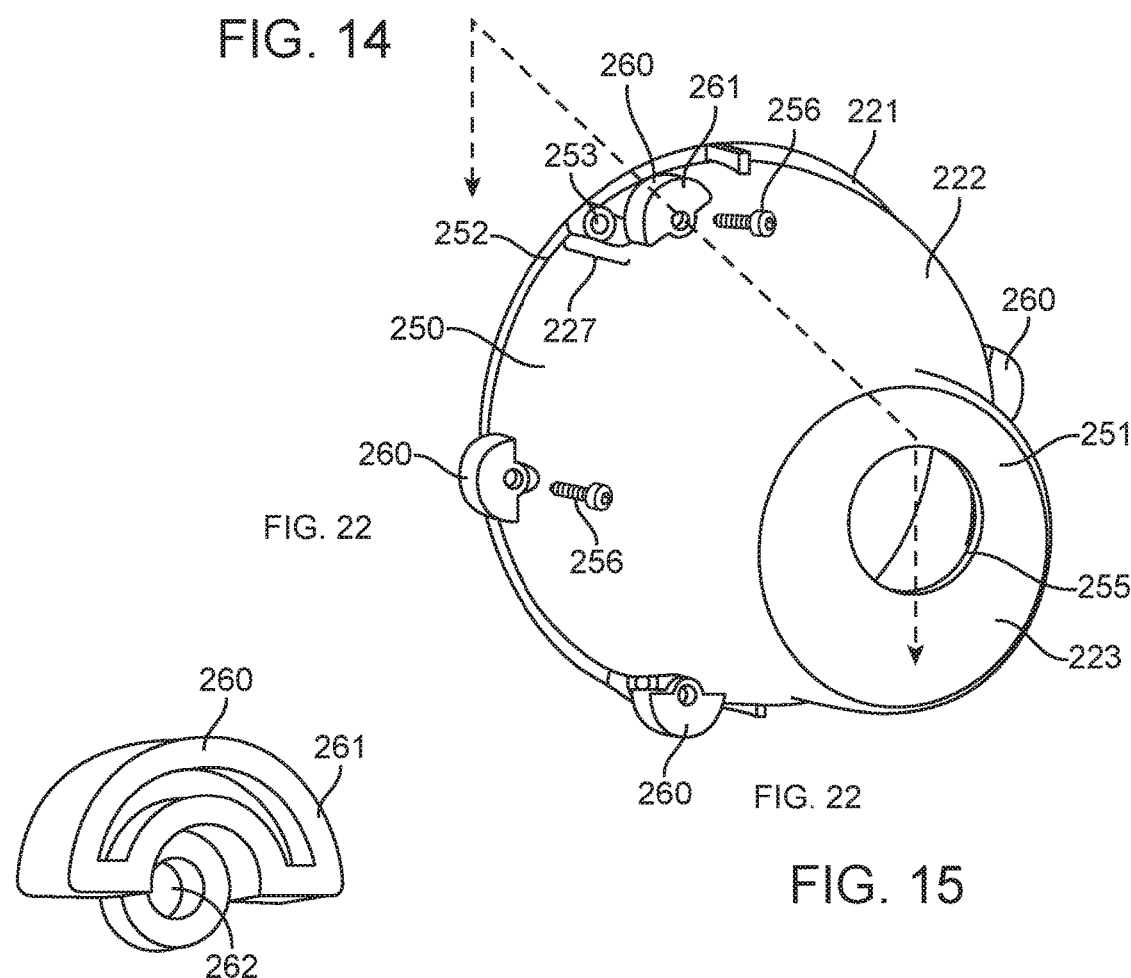
FIG. 22
FIG. 16
FIG. 15

FENDER-TO-GRILLE TURN SIGNAL RELOCATION KIT

RELATED APPLICATION INFORMATION

The present application claims priority under 35 U.S.C. Section 119(e) to U.S. Provisional Patent Application Ser. No. 62/647,999 filed Mar. 26, 2018 entitled "FENDER-TO-GRILLE TURN SIGNAL RELOCATION KIT" the disclosure of which is incorporated herein by reference in its entirety.

BACKGROUND OF THE INVENTION

1. Field of the Invention

The present invention relates generally to automobiles and, more particularly, to a fender-to-grille turn signal relocation kit for enabling a vehicle owner to replace lighted factory fenders that carry legally required lights (e.g. turn signals) with aftermarket fenders that do not have turn signal by easily relocating the existing socket and bulb of the legally required turn signal from the fenders to new locations on the factory grille.

2. Description of the Related Art

Automobile owners like to customize their vehicles, replacing stock or "factory" items with aftermarket ones that work better or improve the vehicle's appearance. This is especially true with the owners of sport utility vehicles such as JEEP® Wranglers because the owners of such vehicles want to achieve a certain "look," provide for increased off-road capability, or both.

A particularly common upgrade is to replacement of the factory fenders with various kinds of aftermarket fenders. FIG. 1 shows a typical JEEP® Wrangler "JK" 110 that was made from 2007-2017. As shown, the JEEP® JK 110 featured stock fenders 111, 111 that carried a running light 112, 112, but the turn signals 113, 113 required by the U.S. Department of Transportation (DOT) were installed in the factory grille. Owners of a JEEP® JK 110 could easily remove the factory fenders and replace them with aftermarket fenders 121, as shown in FIG. 2, because the stock fenders 111 did not carry the DOT-required turn signals 113.

In the 2018 model year, things changed. In particular, as shown in FIG. 3, JEEP® introduced a new version of the sport utility vehicle sold under the trademark JEEP® Wrangler 210, the so-called the JEEP® "JL." The new JEEP® JL 210 features, among other things, fenders 211, 211 that carry the DOT-required turn signals 213, 213. They also carry the running lights 212, 212, but those are not DOT-required lights and can be removed or rewired at the owner's option. Thus, if the owner of a JEEP® JL 210 wants to replace the factory fenders 211, 211 with aftermarket fenders (not shown), they face the difficult dilemma of how to maintain the DOT-required turn-signal capability. Embodiments of the present invention solve that problem.

SUMMARY OF THE INVENTION

In the first aspect, a retrofit vehicle turn signal assembly for attaching to an aftermarket opening formed in a grille of a vehicle is disclosed. The retrofit vehicle turn signal assembly comprises a turn signal housing having a longitudinally spaced proximate front end and a distal rear end separated by a center body, the proximate front end having a circular light exiting opening with an annular lip extending radially outward from the proximate front end of the housing, the center body emerging longitudinally away from the proximate front end to distal rear end forming an internal cavity within the center body, the distal rear end having an aperture, wherein the internal cavity and the aperture of the distal rear end are shaped to receive and secure a light source, wherein the exterior of the proximate front end of the housing is sized to be received by an aftermarket opening formed in the grille of a vehicle formed as a circular through-hole in the grille of the vehicle. The retrofit vehicle turn signal assembly further comprises a lens which at least partially covers the circular light exiting opening of the turn signal housing, and one or more fasteners for securing the turn signal housing to a grille of a vehicle.

In a first preferred embodiment, the through-hole formed in the grille is preferably located adjacent to a cavity of the vehicle engine compartment and is formed by manually drilling the hole through the grille. A diameter of the hole of the grille is preferably greater than a diameter of the exterior of the proximate front end and less than the diameter of the outer perimeter of the annular lip. The turn signal housing is preferably secured to the grille by the fasteners urging and clamping the grille of the vehicle to the lip of the proximate end of the housing. The proximate front end and the adjacent regions of the center body preferably further comprises one or more channels formed in the turn signal housing, for each channel, a post having a threaded hole formed near the perimeter of the proximate front end. The one or more fasteners preferably each comprise a washer section having a protruding ear, the washer section having a through hole, and a screw placed through the hole in the washer section and coupling to the threaded posts.

The lens is preferably selected from a group consisting of: a clear lens, emitting the color the light source, or a yellow-amber lens, emitting a generally yellow-amber light. The light source is preferably relocated from the original vehicle manufactured location to the turn signal housing attached to the opening in the grille. The retrofit vehicle turn signal assembly is preferably designed for a sport utility vehicle.

In a second aspect, a method for retrofitting a vehicle turn signal assembly to a grille of a vehicle is disclosed. The method comprises removing a grille from a vehicle, the grille having a front outward facing surface and a rear surface facing an engine compartment of the vehicle, determining a location of a hole to be drilled, drilling a hole into the grille, placing a vehicle turn signal assembly onto the hole of the grille, and securing the vehicle turn signal assembly to the grille.

In a second preferred embodiment, determining a location of a hole to be drilled comprises placing a drill template made for a specific vehicle onto the front surface of the grill, aligning the drill template on the front surface of the grill so that the drill template is leveled and follows a body line of the grill, and marking the location of the 15 hole based on the location on the grille revealed by the aligned and leveled drill template. The method preferably further comprises removing a plastic bracket from the rear surface of the grille. Securing the vehicle turn signal assembly to the grille preferably comprises securing fasteners to screw holes formed in the turn signal housing. Placing a vehicle turn signal assembly onto the hole of the grille preferably 20 comprises identifying and selecting a turn signal assembly for a driver-side and passenger-side application, and aligning the vehicle turn signal assembly based on positioning the assembly to point upwards based on indicia formed on the turn signal housing. The vehicle preferably comprises a sport utility vehicle.

In a third aspect, a retrofit vehicle turn signal assembly for attaching to an aftermarket opening formed in a grille of a vehicle is disclosed. The retrofit vehicle turn signal assembly comprises a turn signal housing having a longitudinally spaced proximate front end and a distal rear end separated by a center body, the proximate front end having a light exiting opening, the center body emerging longitudinally away from the proximate front end to distal rear end forming an internal cavity within the center body, the distal rear end having an aperture, wherein the internal cavity and the aperture of the distal rear end are shaped to receive and secure a light source, wherein the exterior of the proximate front end of the housing is sized to be received by an aftermarket opening formed in the grille of the vehicle. The retrofit vehicle turn signal assembly further comprises a lens which at least partially covers the light exiting opening of the turn signal housing, and one or more fasteners for securing the turn signal housing to a grille of a vehicle.

In a third preferred embodiment, the proximate front end further comprises a lip extending laterally outward from the proximate front end of the housing. The opening formed in the grille is preferably located adjacent to a cavity of the vehicle engine compartment and is formed by manually drilling the hole through the grille. The lens is preferably selected from a group consisting of a clear lens, emitting the color the light source, or a yellow-amber lens, emitting a generally yellow-amber light. The light source is preferably relocated from the original vehicle manufactured location to the turn signal housing attached to the opening in the grille. The retrofit vehicle turn signal assembly is preferably designed for a sport utility vehicle.

These and other features and advantages of the invention will become more apparent with a description of preferred embodiments in reference to the associated drawings.

DESCRIPTION OF THE DRAWINGS

FIG. 14 is a top, perspective view of the turn signal housing.

FIG. 15 is a rear, perspective view of the turn signal housing.

FIG. 16 is a top, perspective view of a washer shown in FIG. 15.

FIGS. 30, 30A, and 30B are perspective views of a user removing a plastic bracket for the grille.

DETAILED DESCRIPTION OF THE PREFERRED EMBODIMENTS

In one or more embodiments, a vehicle turn signal assembly enables users to customize their vehicles by repositioning a turn signal from a factory original fender location, for example, to an aftermarket opening or hole formed on the grille. Using special drill templates designed for a specific vehicle, users can locate a position for a hole, and later drill a hole into the grille of a vehicle. The users can then insert an aftermarket turn signal assembly into the hole, and secure the turn signal assembly to the grill. The users can then move the factory original turn signal socket from the original fender location, and place the factory original turn signal socket within the aftermarket turn signal housing—without needing to provide a new socket and without modifying the electrical connection between the factory original turn signal socket and its associated wires (i.e. without cutting or splicing the wires).

As used herein, the terms "fasteners," "washers," and "mounting tabs" are used interchangeably and may refer to the mechanism for securing a vehicle turn signal assembly or housing to a grille of a vehicle. The terms "factory" and "factory original" may refer to original components of a vehicle made and assembled by the manufacturer of the vehicle. The terms "aftermarket" and "retrofit" refer products and processes that may be developed by third-parties other than the vehicle manufacturer, and may involve altering, modifying, or adding components to a factory original vehicle.

While embodiments described herein describe a vehicle turn signal assembly and methods for relocating a turn signal assembly to a grille of a JEEP®, it shall be understood that this description shall be non-limiting and that other types of aftermarket vehicle lighting or vehicle components on other cars, trucks, and other vehicles are contemplated in one or more embodiments. Reference is made herein to one or more sport utility vehicles sold under the trademark JEEP®.

Figure 1:
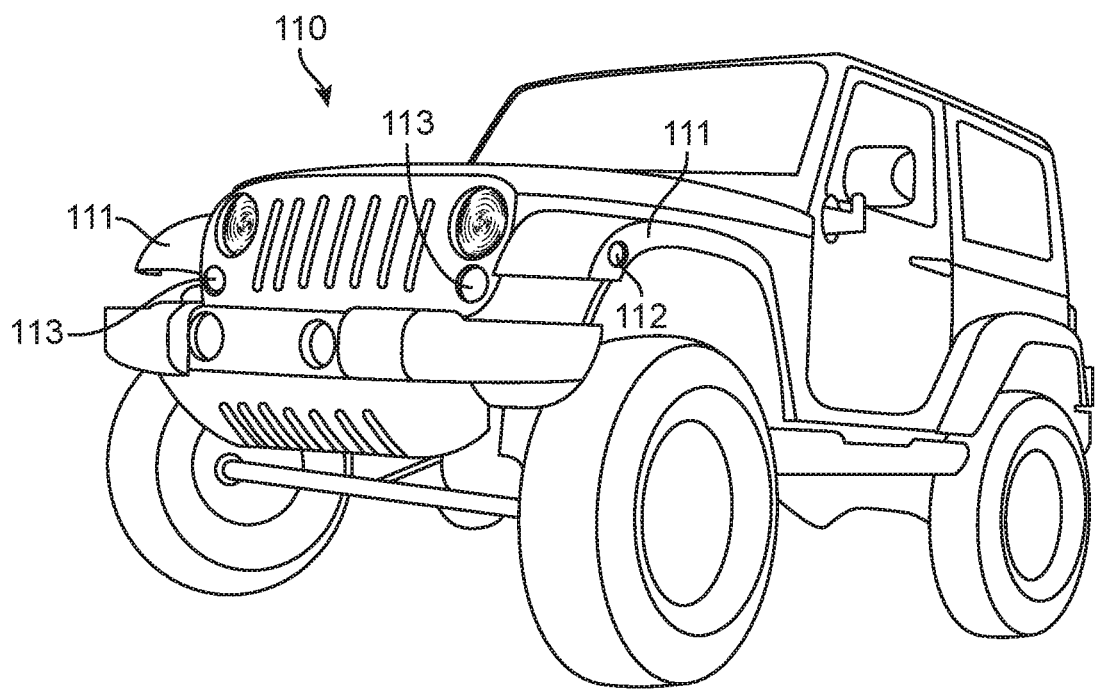
FIG. 1 is a perspective view of a JEEP® Wrangler JK made from 2007-2017 showing the placement of the turn signal lights installed on the grille.
Figure 2:
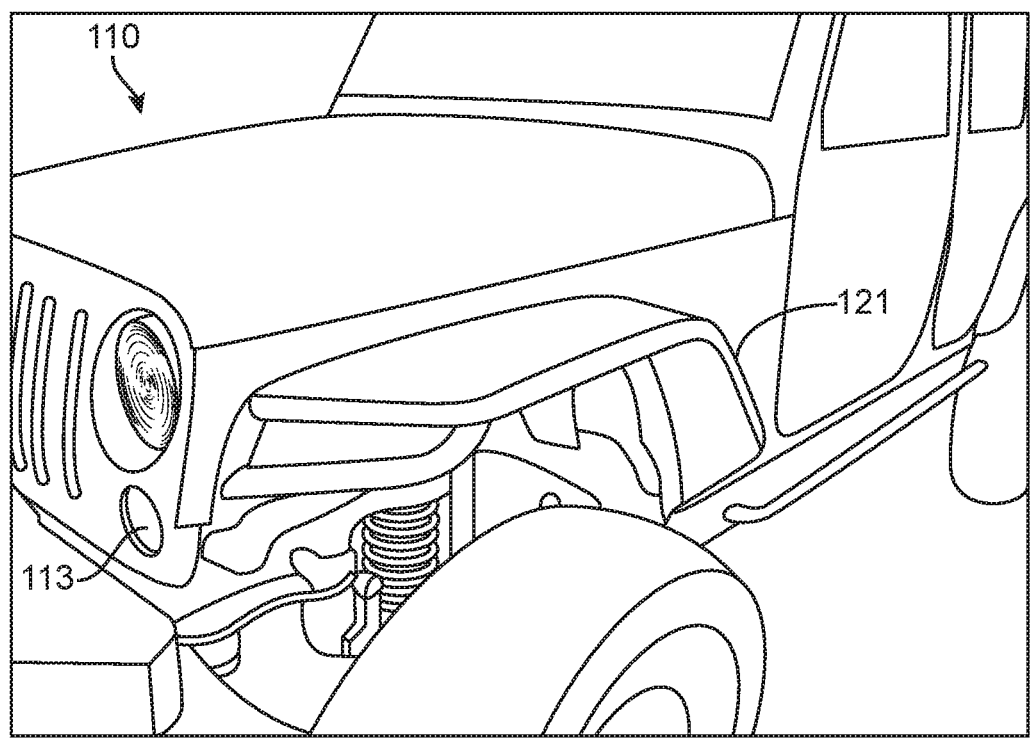
FIG. 2 is a perspective view of a JEEP® Wrangler JK fitted with aftermarket fenders.
Figure 3:
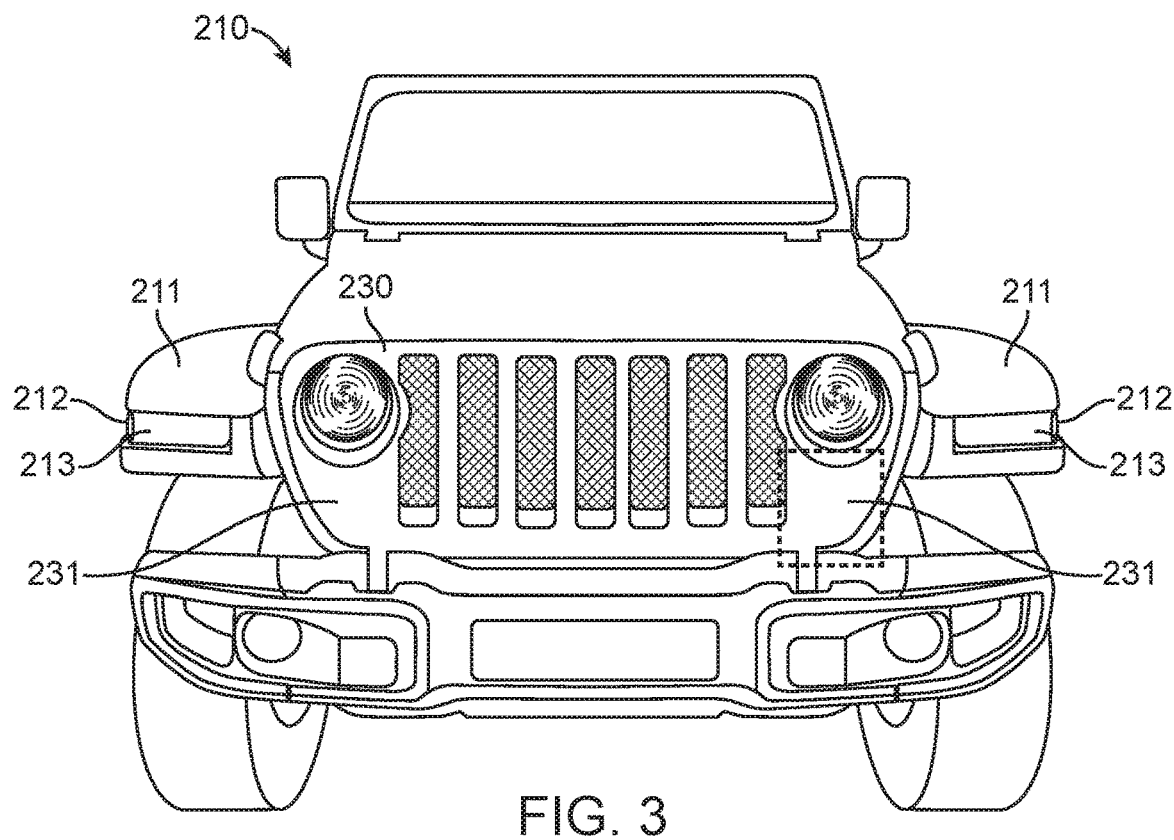
FIG. 3 is a front, perspective view of a JEEP® Wrangler JL manufactured in 2018 showing the turn signal lights on the fenders.

FIGS. 1-3 illustrate various model years of sport utility vehicles. FIG. 1 shows a typical JEEP® Wrangler "JK" 110 that was made from 2007-2017 and had the turn-signals 113, 113 installed on the grille. FIG. 2 shows the JEEP® 110 from FIG. 1 with aftermarket fenders 121, 121 (ignore the color change). FIG. 3 shows a JEEP® Wrangler "JL" 210 from 2018 on which has fenders 211, 211 that carry the DOT-required turn signals 213, 213, making it difficult to legally replace the factory fenders with aftermarket fenders;

As first explained above, a problem has arisen from the fact that the new model of the sport utility vehicle sold under the trademark JEEP® 210 come with stock fenders 211, 211 that carry the DOT-required turn signal 213, 213. If the fenders 211, 211 are replaced, the new fenders must be configured to continue to carry the housing, lens, bulb and socket of the factory turn signals 213, 213, or the owner has to cut the wires and re-wire them to new DOT-compliant turn signals carried by the replacement fenders.

Figure 4:
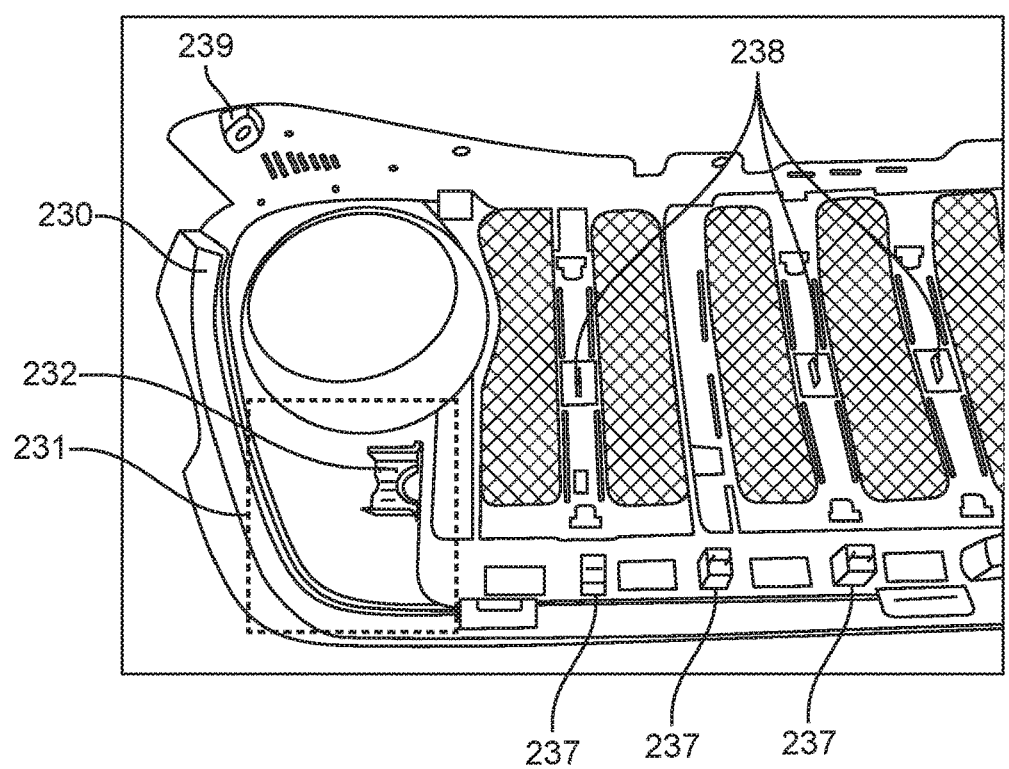
FIG. 4 is a perspective view of the backside of a grille.

As shown in FIG. 3, the JEEP® JL 210 has a grille 230 with a solid wall section that provides a generally blank region 231, 231 on the front of the grille. Region 231 was considered as a relocation spot for the turn signals. However, there are two problems with considering this as a place for relocated turn signals. First, unlike the grilles used with the JEEP® JK 110 shown in FIG. 1, the grille 230 on the JEEP® JL 210 shown in FIG. 3 is spaced so closely to other vehicular structure that it is generally not possible to provide a housing that is deep enough to accommodate the existing socket and bulb. Second, as shown in FIG. 4, the back side of the grille's blank regions 231, 231 carry brackets 232, 232 one on each side, that make it difficult to use this blank area 231, 231 for relocated turn-signals. The brackets 232, 232 connect the blank portions 231, 231 of the grille 230 to other vehicular structure in corresponding portions 242, 242 of the vehicle (See FIGS. 5 and 6) and are, therefore, very much in the way.

A critical determination that make this signal relocation system possible is the observation and experimental confirmation that the factory grille 230 can remain sufficiently secure to the remainder of the automobile even without the two brackets 232. This is possible because the grille 230 is relatively rigid and secured by numerous other fasteners and features. For example, as shown in FIG. 4, the bottom edge of the factory grille 230 has a series of bosses 237 with protruding tabs that each engage with a spring clip. There are also centrally located bosses 238 with tabs that similarly engage spring clips on the front of the radiator (not shown). And, finally, there are holes in the top flange 239, one on each side, that receive plunger-type rivets that can be pulled out and replaced.

Because of all of these additional securement features, the corner brackets 232 are essentially superfluous, i.e. that they were added in a bit of overkill. With that realization in hand, and the observation of the hollow space 245, this turn signal relocation system provides a unique way to relocate the factory provided turn signal socket and bulb, without cutting or splicing the wires, when installing aftermarket fenders.

It is not presently believed that any additional connection mechanism need be provided, but of course if that determination changes, additional connections could be provided without departing from the spirit of one or more embodiments.

Figure 5:
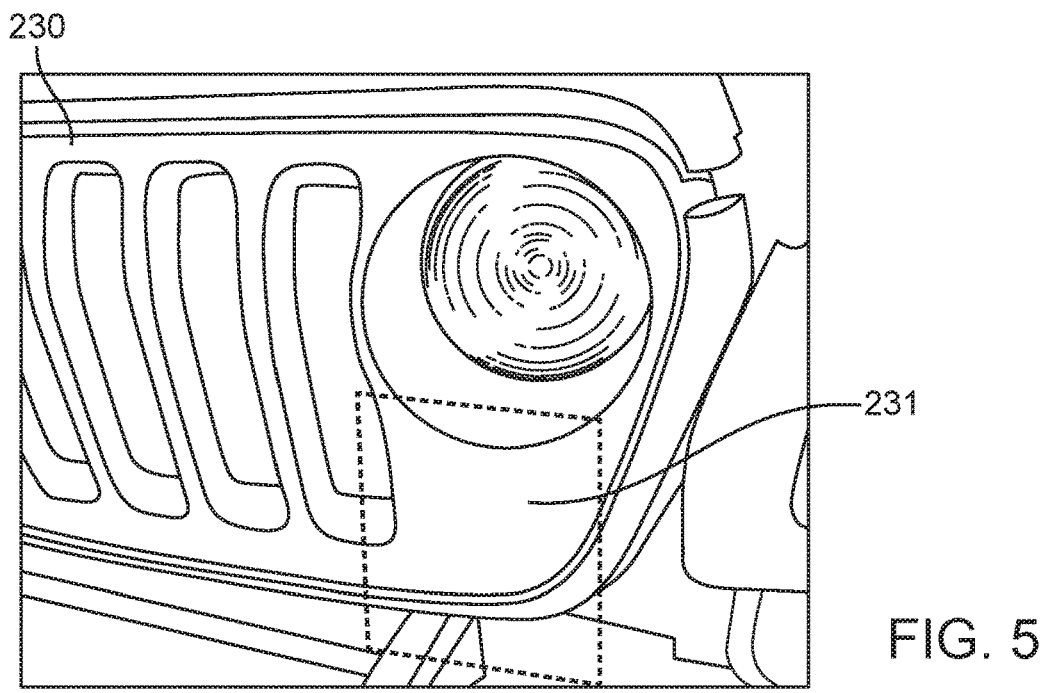
FIG. 5 is a perspective view of the section of the grille showing a blank portion.
Figure 6:
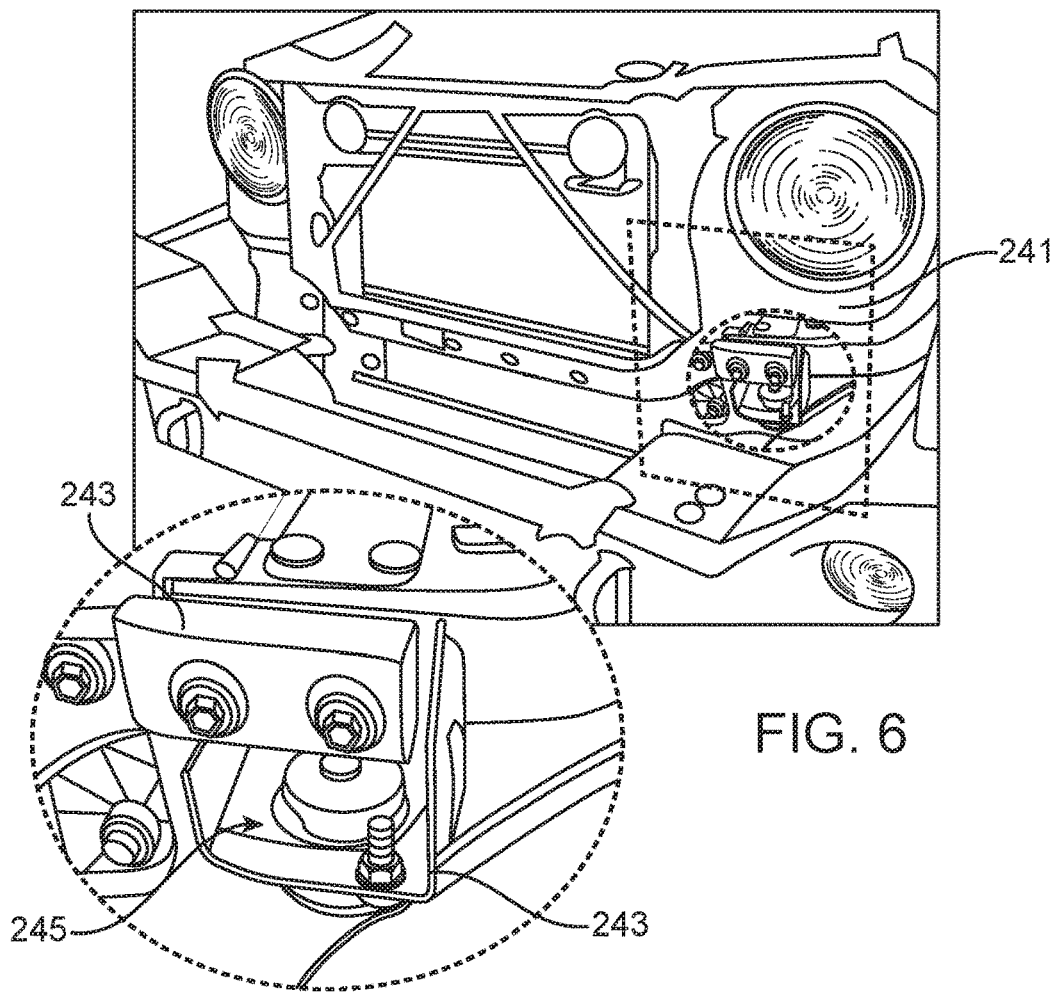
FIG. 6 is front, perspective view of a JEEP® with the grille removed.

FIGS. 5 and 6, taken together, show how one of the blank portions 231 of the grille 230 connect to a corresponding portion 241 of the vehicular structure behind the grille 230. FIG. 6, in particular, includes a close-up of certain grille-adjacent structure in portion 241 including a horizontal member 243, and a U-shaped member 244 that collectively define a cavity or hollow space 245 where a vertical connection is made to a vibration bushing of some kind. There are two such hollow spaces 245, 245, one on each side. The present inventor realized that it may be possible to make unique and beneficial use of the hollow spaces 245, 245.

Figure 7:
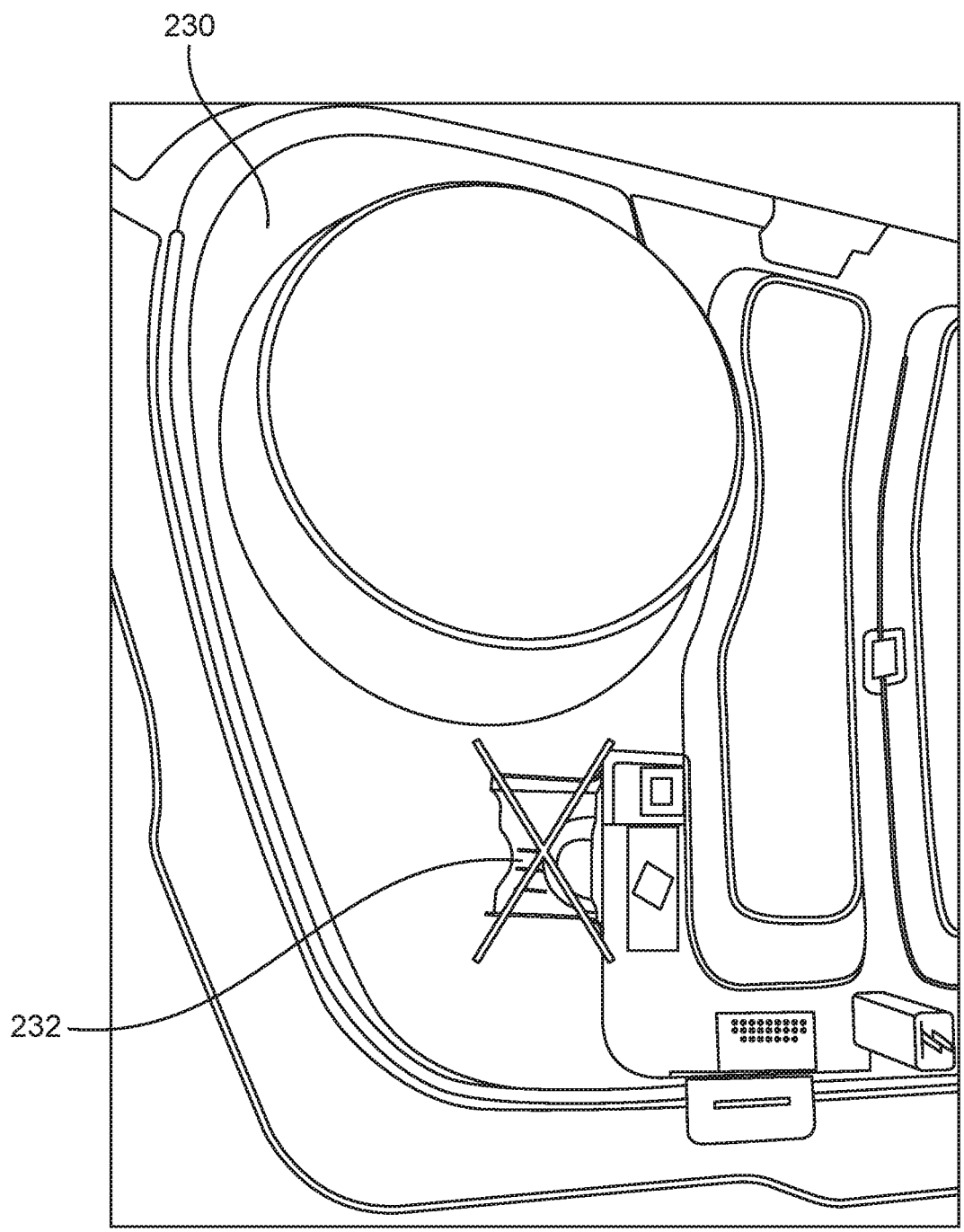
FIG. 7 is a view of the backside of the grille showing a bracket that is removed for the assembly of the retrofit vehicle turn signal assemblies.

FIG. 7, as suggested by the "X," shows how the owner would modify the factory grille 230 by simply removing the brackets 232, 232 from the back side of the grille 230. In practice, being made of plastic, the owner would likely be instructed to score the bracket 231 with a razor knife, and then snip it off with tin snips or similar.

Figure 8:
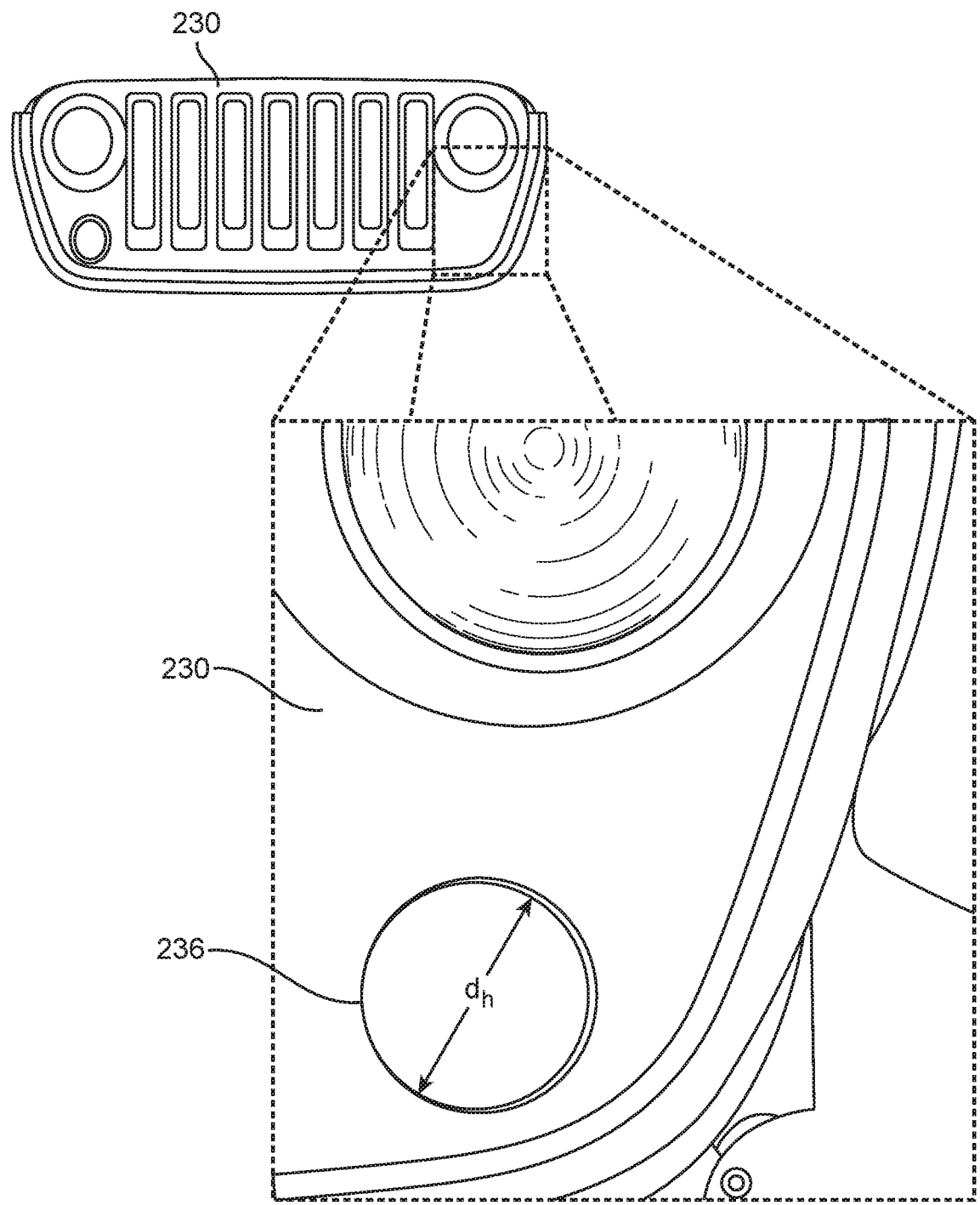
FIG. 8 is a front view of a modified grille showing holes for receiving turn signal assemblies.

FIG. 8 shows the front of the factory grille 230, more specifically showing how the owner would further modify the factory grille 230, i.e. to create suitable holes 236 in the factory grille 230, one on the left (signified with a circle) and one on the right (zoomed in). The new holes 236, 236 are sized to receive a new, custom turn signal housing and lens as described below. The hole would likely be cut with an off the shelf 2⅜" diameter hole saw to form the hole 236 having a diameter indicated by "$d_h$."

Figure 10:
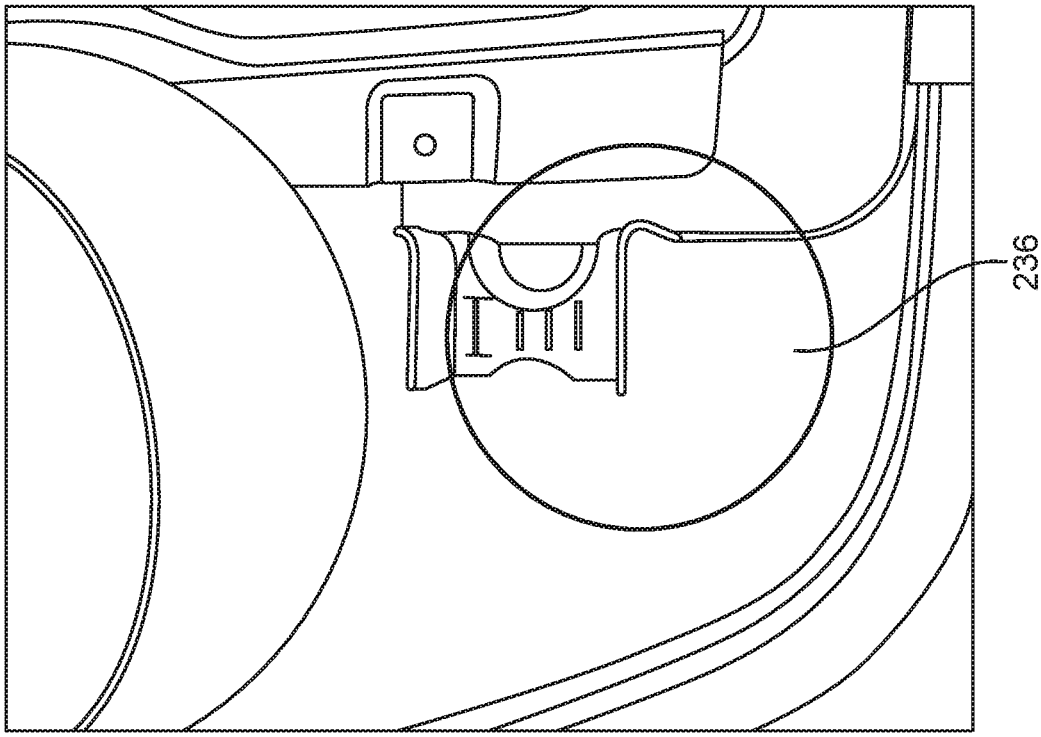
FIGS. 9 and 10 are views of the back side of the grill showing the removal of brackets.
Figure 9:
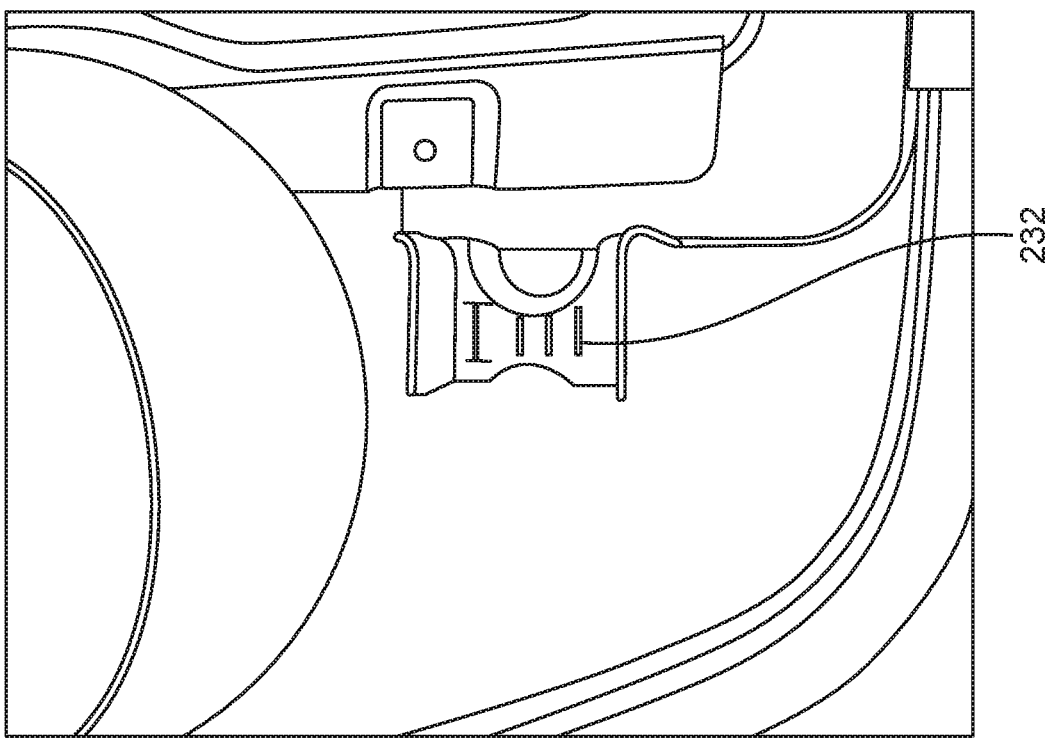

FIGS. 9 and 10 show the back of the factory grille 230, suggesting more specifically how one can remove the brackets 232 to make the holes 236 that will hold the relocated turn signals.

Figure 11:
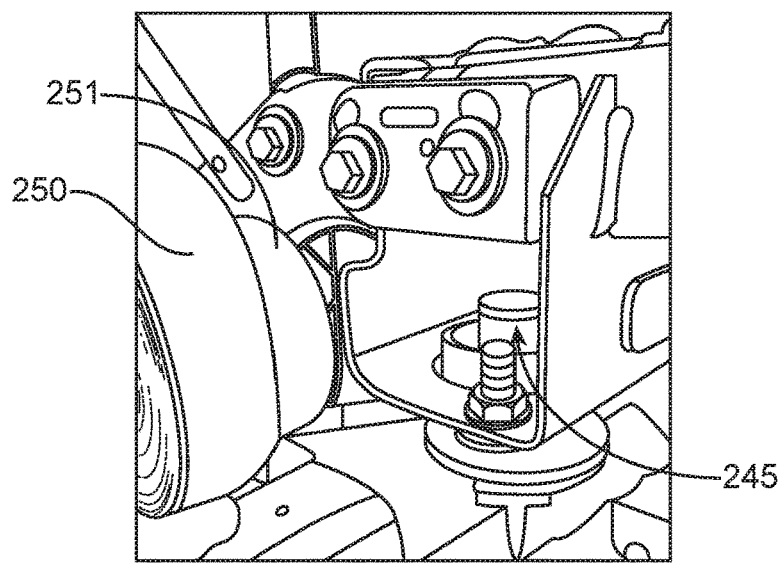
FIGS. 11-13 are perspective views illustrating that turn signal assembly may be accommodated by hollow space behind the backside of the grille.
Figure 12:
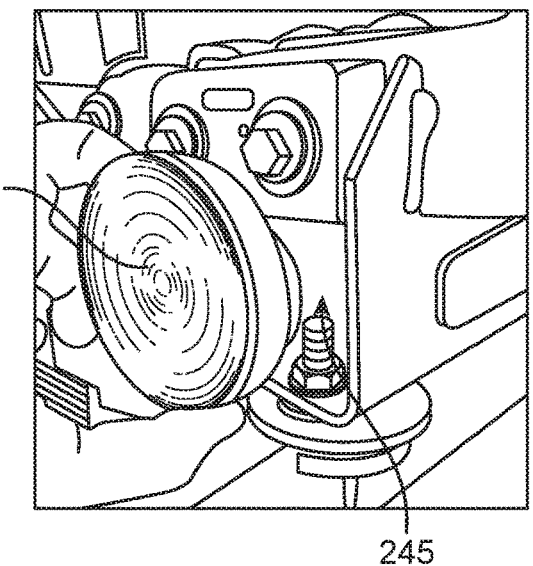
Figure 13:
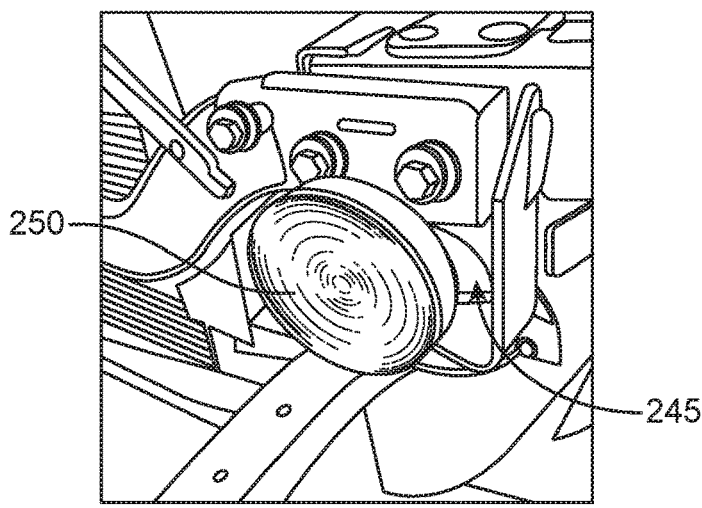

FIGS. 11, 12 and 13 show how a new, custom turn signal housing 250 has a back portion 251 that will extend into and be accommodated by the hollow space 245 created by the vehicle's grille-adjacent structure.

FIGS. 14 and 15 show the front and back of the presently preferred turn signal housing 250 and its rear extension 251 comprising a center body 222 and a distal rear end 223 that is received by the hollow space 245 (FIG. 6). As shown, the presently preferred housing 250 is secured in the hole 236 formed in the factory grille 230 by sandwiching the grille 230 between a lip 252 and plurality of washers 260 that have protruding ears 261 that are secured to a corresponding plurality of screw holes 253 with screws 256. The rear extension 251, specifically the distal rear end 223, includes an aperture 255 for receiving the existing sockets and bulbs that were originally mounted in the rectangular turn-signal housings 213, 213 found on the factor fenders 211, 211 (see FIG. 3). While not shown, the aperture 255 in the aftermarket turn signal housing 250 would be configured to receive the factory original turn signal socket (i.e. it would have the appropriate mounting features such as a bayonet configuration). In a preferred embodiment, the proximate front end 221 has a circular light exiting opening 224 with an annular lip 252 extending radially outward from the proximate front end 221 of the housing 250.

FIG. 16 shows the presently preferred washer 260 having a protruding ear 261 and a hole 262 from an opposite side than that shown in FIG. 15.

Figure 17:
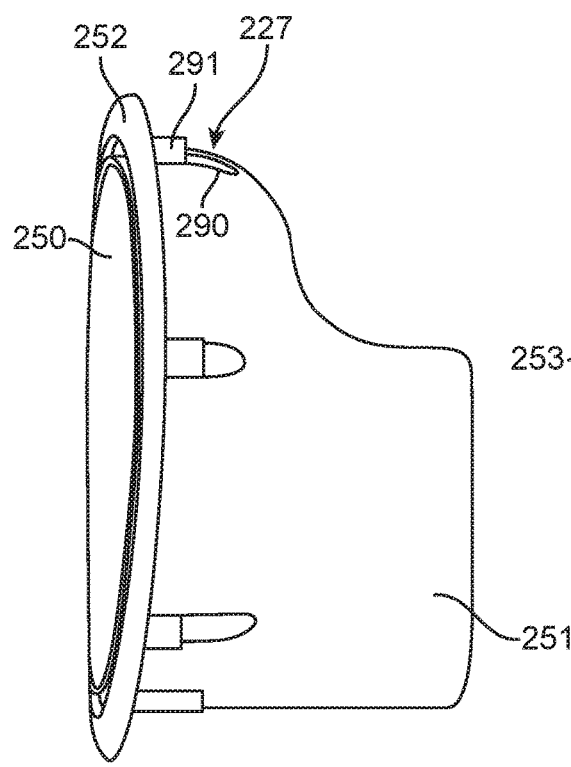
FIGS. 17, 18, and 19 are side, rear, and front perspectives views respectively of a turn signal housing.
Figure 18:
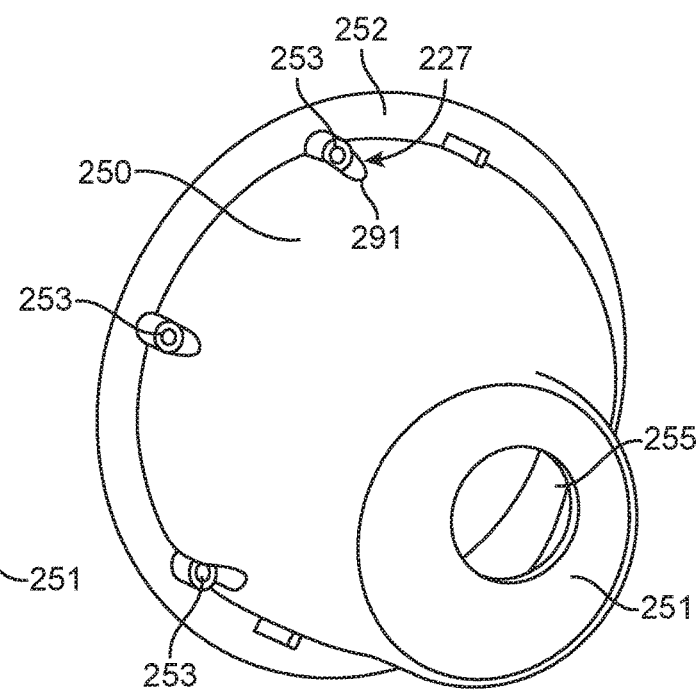
Figure 19:
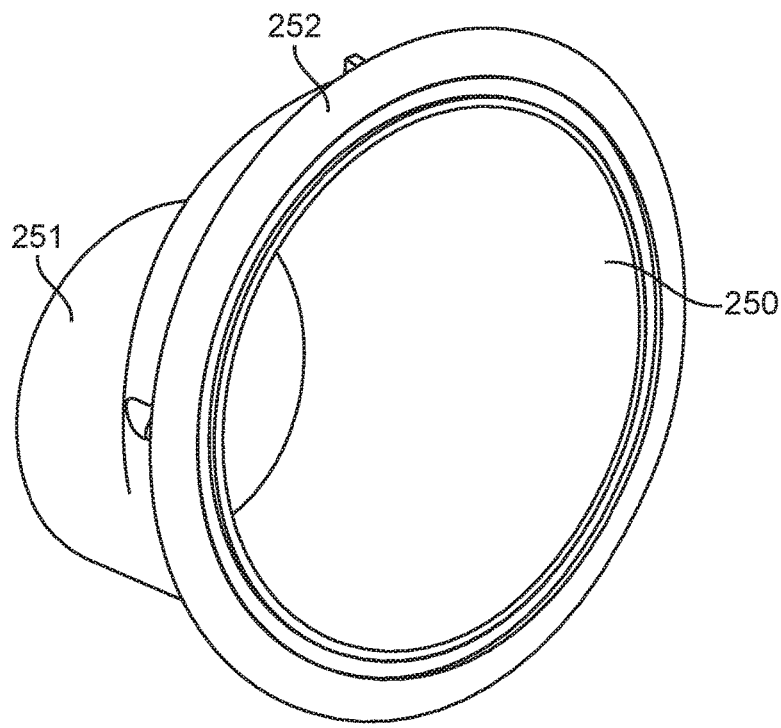

FIGS. 17, 18, and 19 are additional figures showing the construction of the presently preferred housing 250 from different angles.

Details regarding the fastening of the housing 250 can be understood by referring to FIGS. 15, 17-19, and 22 below. The proximate front end 221 and the adjacent regions of the center body 227 have a plurality of channels 290 formed in the turn signal housing 250. For each channel 290, a post 291 having a threaded hole 253 is formed near the perimeter 227 of the proximate front end 221. Each of the washers 260 (i.e., fasteners) has a protruding ear 261 and a through hole 262. A screw 256 is placed through the hole 262 in the washer 260 and is threaded and coupled to the threaded screw holes 253. As discussed above, the turn signal housing 250 is held in place in the hole 236 of the grille 230 by sandwiching the grille between the lip 252 and the washers 260.

Figure 20:
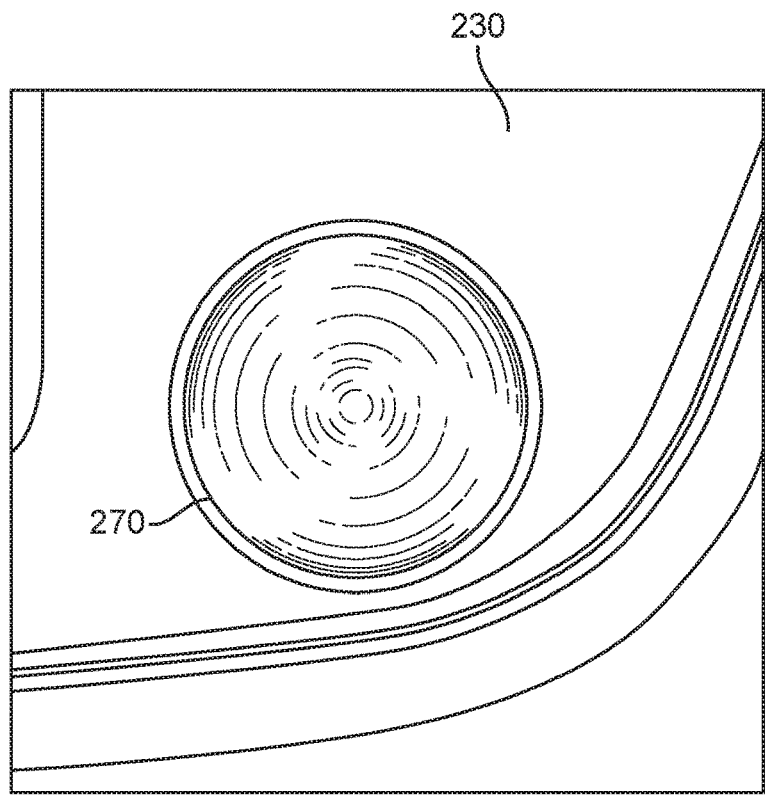
FIG. 20 is a front view of a turn signal light installed into a grille.

FIG. 20 is a view of a prototype installation with a clear lens 270 snapped onto or otherwise attached to the housing 250 (not visible) secured to the factory grille 230. The lens 270 is clear and designed to diffuse the bulb that is amber. In some cases other than the current JEEP® JLs, the bulb is white and the lens is amber. In the preferred embodiment, however, if the user wants to simply relocate the factory bulb, which is amber, the lens 270 would be clear.

Figure 21:
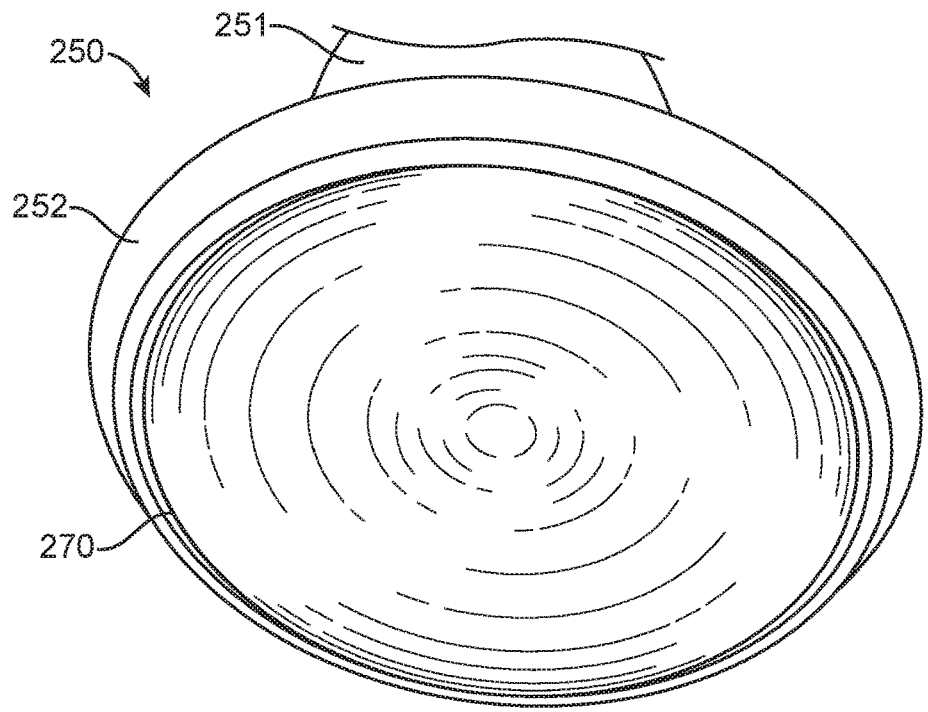
FIG. 21 is a perspective view of a turn signal housing having a lens.

FIG. 21 is a view of a presently preferred turn signal housing 250 with its lip 252 and with a clear lens 270 installed thereon. The benefit of this unique system is that it permits one to reuse the factory provided DOT-compliant bulb and socket with relatively little effort. The illustrated system results in a relocated turn signal that has a round lens 270, which is aesthetically desirable, but any desired shape could be provided.

Figure 22:
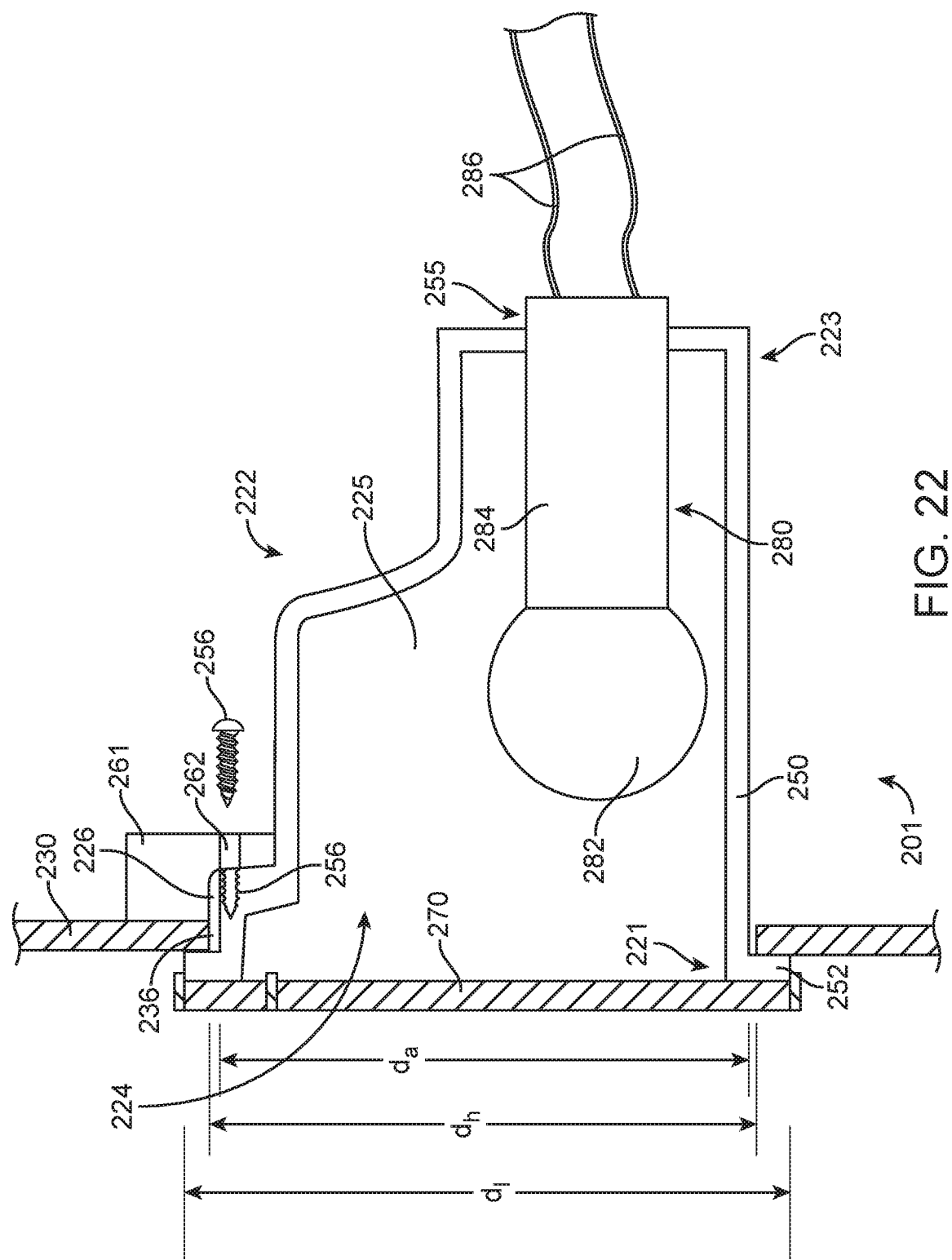
FIG. 22 is a cross-sectional view of the turn signal assembly as shown in FIG. 16 with one of the vehicle's factory provided turn signal sockets relocated from the vehicle's fender and simply inserted into the aperture of the aftermarket turn signal housing without modifying an electrical connection between the factory original turn signal socket and the associated wires.

FIG. 22 is a cross-sectional view of the retrofit vehicle turn signal assembly 201 as shown in FIG. 16. The retrofit vehicle turn signal assembly 201 is adapted for attaching to an aftermarket opening 236 formed in a grille 230 of a vehicle. The retrofit vehicle turn signal assembly 201 comprises a turn signal housing 250 having a longitudinally spaced proximate front end 221 and a distal rear end 223 separated by a center body 222. In a preferred embodiment, the proximate front end 221 has a circular light exiting opening 224 with an annular lip 252 extending radially outward from the proximate front end 221 of the housing 250. As used herein and as commonly known in the art, the term "longitudinally" is the direction parallel to the length of an object, which in this case is from the proximate front end 221 to the distal rear end 223. The term "radially" refers to directions perpendicular to the longitudinal axis. In one or more embodiments, the light opening 224 and the lip 252 may be non-circular.

The center body 222 emerges longitudinally away from the proximate front end 221 to a distal rear end 223 forming an internal cavity 225 within the center body 222. The distal rear end 223 has an aperture 255, where the internal cavity 225 and the aperture 255 of the distal rear end 223 are shaped to receive and secure a light source 280. The exterior 226 of the proximate front end 221 of the housing 250 is sized to be received by an aftermarket opening 236 formed in the grille 230 of a vehicle formed as a circular through-hole in the grille 230 of the vehicle.

The retrofit vehicle turn signal assembly 201 further comprises a lens 270 which at least partially covers the circular light exiting opening 224 of the turn signal housing 250, and one or more fasteners 260 for securing the turn signal housing 250 to a grille 230 of a vehicle.

In an embodiment, the diameter of the hole 236 of the grille 230 (represented as "$d_h$" in FIG. 22) is greater than a diameter of the exterior 226 of the proximate front end 221 (represented as "$d_a$"). The diameter of the hole 236 of the grille 230 (represented as "$d_h$") is less than the diameter of the outer perimeter or exterior 226 of the front end of the annular lip 252 (represented as "di").

The turn signal housing 250 is secured to the grille 230 by the fasteners 260 urging and clamping the grille 230 of the vehicle to the lip 252 of the proximate front end 221 of the housing 250.

The light source 280 may comprise a bulb 282 and a factory original turn signal socket 284 having associated wires 286 for delivering current to the bulb 282. In a preferred embodiment, the light source 280 is relocated from the original vehicle manufactured location to the turn signal housing 250 attached to the opening 236 in the grille 230. This simple relocation of the factory original turn signal socket 284 is made possible by the aperture 255 in the aftermarket turn signal housing 250 having mounting features that correspond to the original mounting features on the factory original housing (e.g. a bayonet configuration) and the fact that the socket's associated wires 286 are longer than necessary to reach the new location on the grille given the prior location on the fenders.

The lens 270 is selected from a group consisting of: a clear lens, emitting the color the light source, or a yellow-amber lens, emitting a generally yellow-amber light.

In a preferred embodiment, the retrofit vehicle turn signal assembly 201 is designed for a sport utility vehicle sold under the trademark JEEP®.

FIGS. 23-34 describe the aftermarket parts and the installation instructions for mounting a retrofit vehicle turn signal assembly onto a grille of a vehicle. While the description may refer to a specific make and model (i.e. 2018-2019 JEEP® Wranger JL), it is understood that other embodiments may be employed for securing aftermarket lights to other vehicles.

Figure 23:
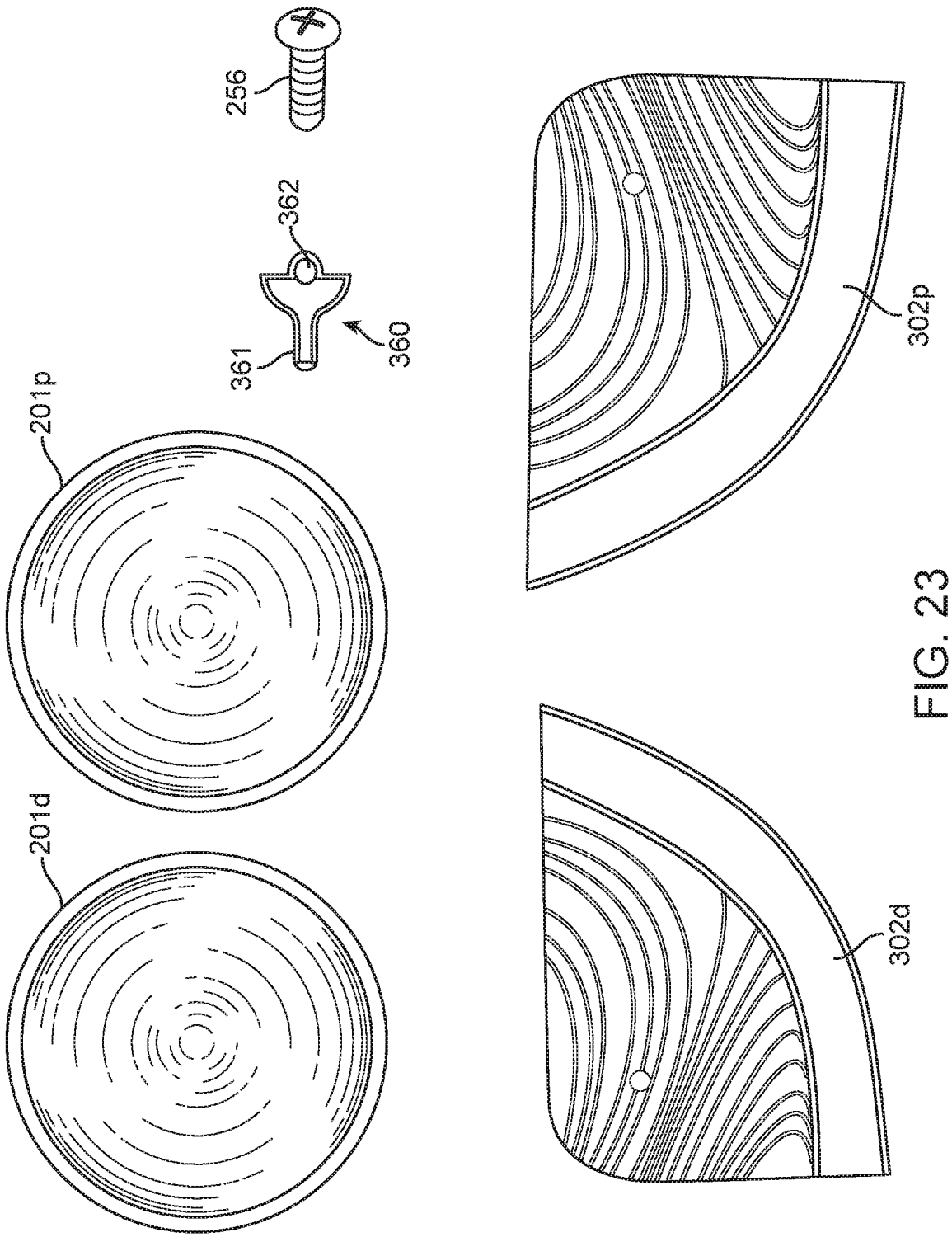
FIG. 23 is a top view of the components used in installing a turn signal assembly into a grille.

FIG. 23 is a top view of the components used in installing a turn signal assembly into a grille. The components include one driver side turn housing 201d, a passenger side housing 201p, six mounting tabs 360 (i.e., fastener or washer), six Phillips head screws 256, a driver side drill template 302d and a passenger side drill template 302p. Other tools that may be employed include a plastic clip removal tool, a Phillips head screw driver, and a Drill Hole saw drill bit having 3⅜" diameter. The mounting tabs 360 has a center through-hole 362 and a protruding ear 361

Figure 24:
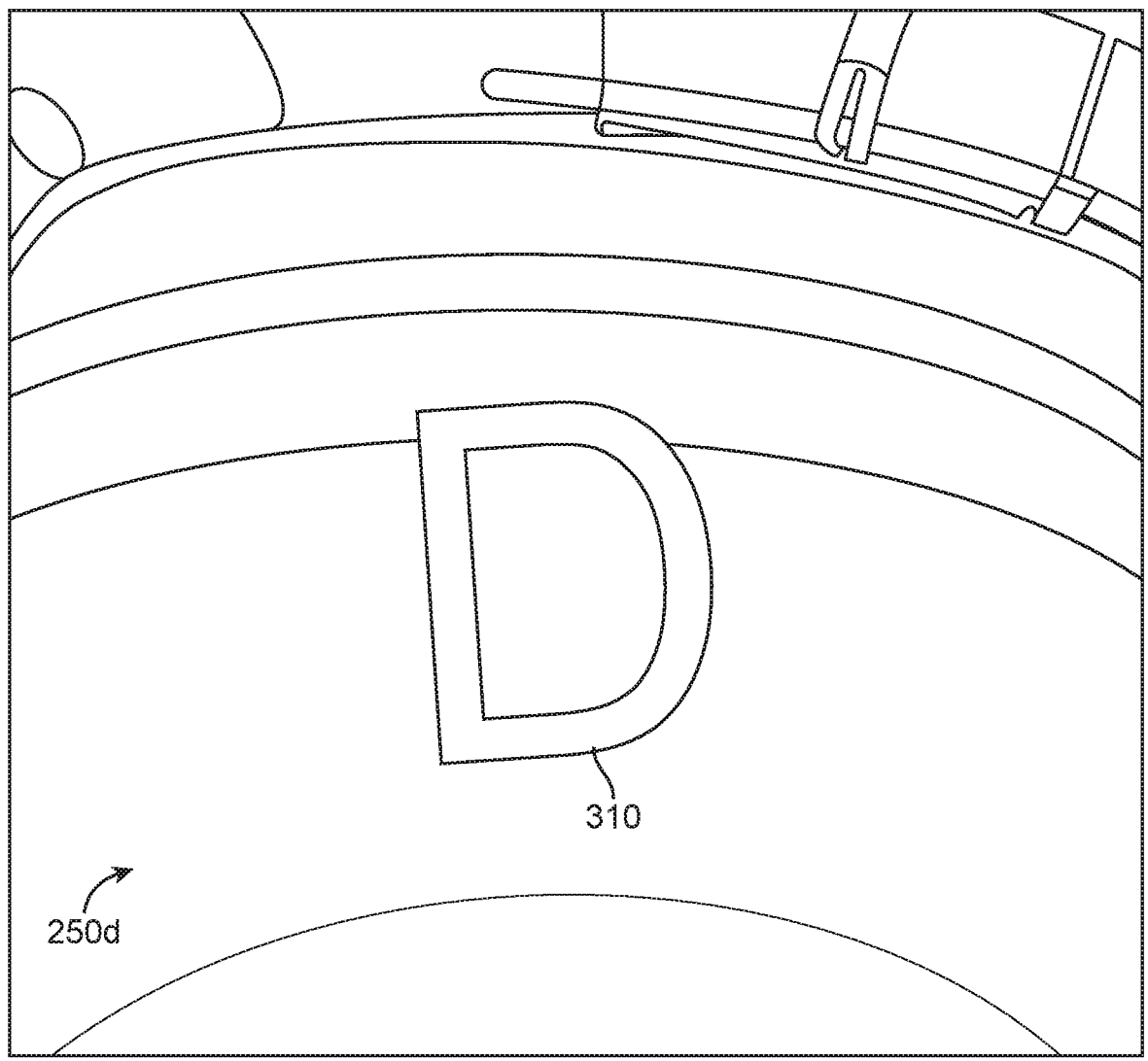
FIGS. 24 and 25 are top views of turn signal housings where one housing has an embossed "D" indicating the assembly is for the driver side of the grille, and another housing having an embossed "P" indicating the assembly is for the passenger side of the grille.
Figure 25:
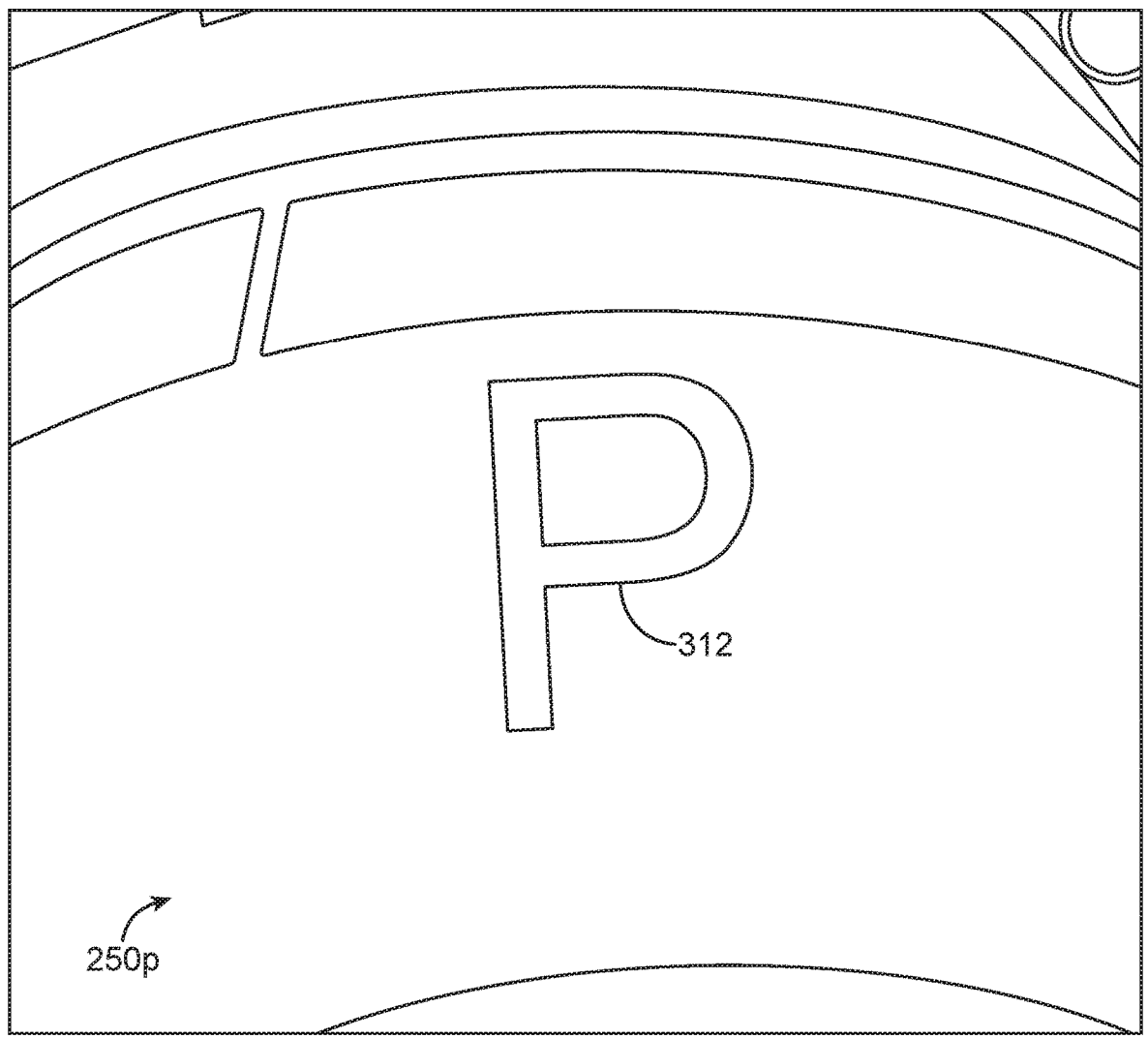

FIG. 24 is a top view of turn signal housings 250d having an embossed "D" indicating the assembly is for the driver side of the grille. FIG. 25 is a top view of turn signal housings 250 having an embossed "P" indicating the assembly is for the passenger side of the grille. These correspond to the position that these brackets are located on the JEEP®. Failure to correctly position these housing will prevent the user from correctly installing the turn signal inserts.

Figure 26:
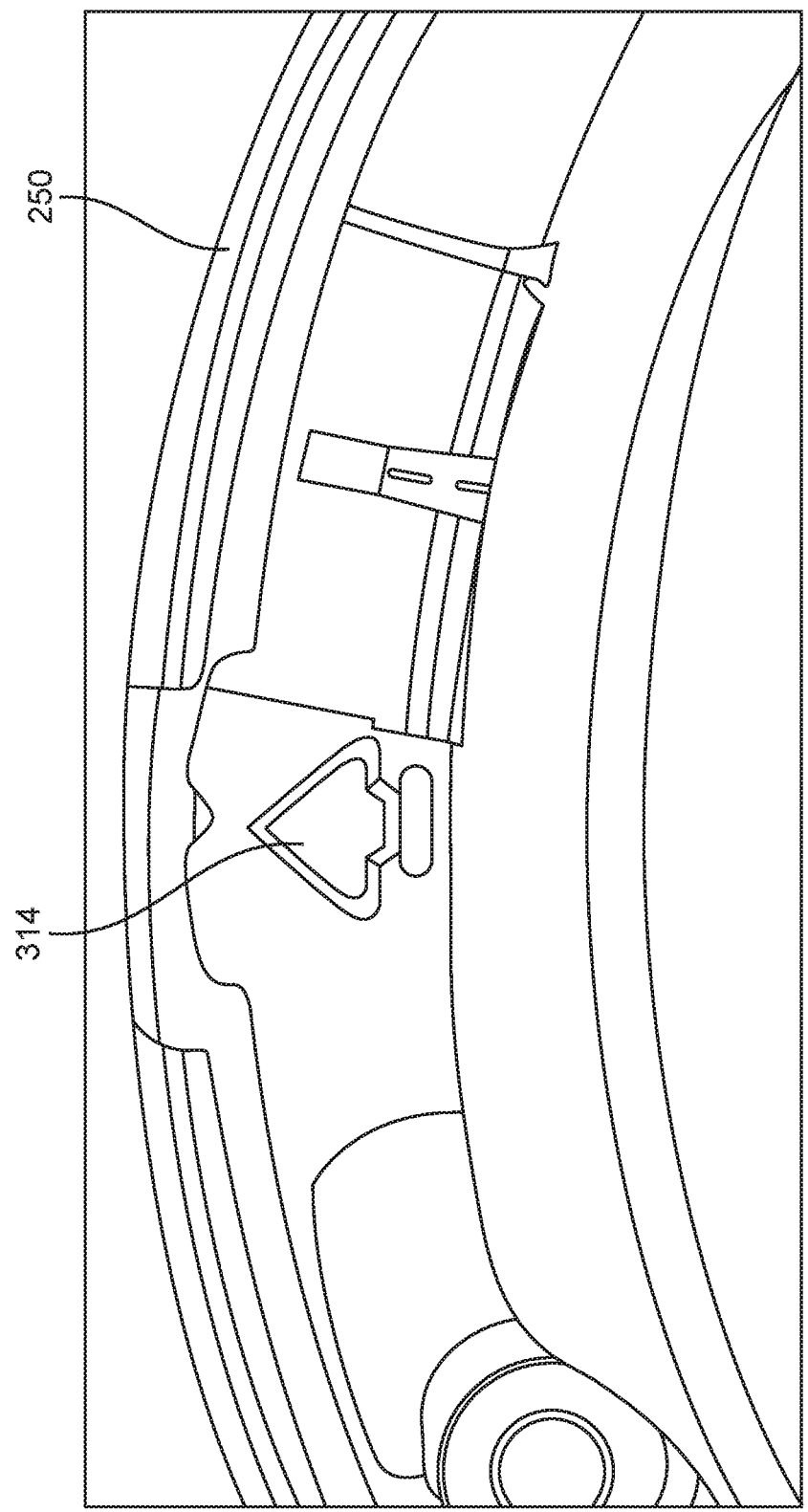
FIG. 26 is a top view of an "up" arrow indicating the orientation of the turn signal assembly on the grille.

FIG. 26 is a top view of an "up" arrow indicating the orientation of the turn signal assembly on the grille. Users are instructed to make sure the arrow marked behind the housing is pointing upwards when installing.

Figure 27:
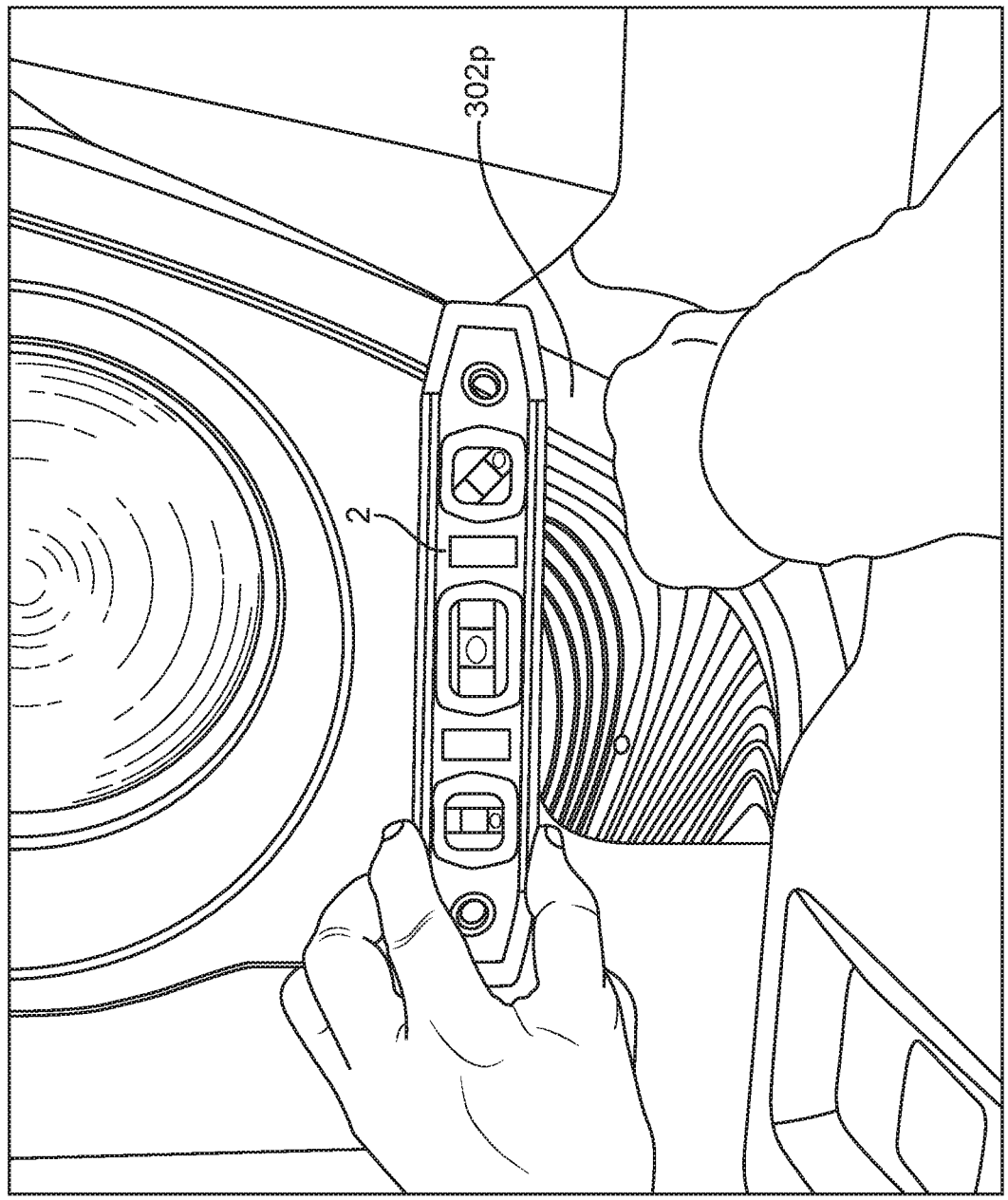
FIG. 27 is a perspective view of a user locating the position of the hole for the turn signal assembly by aligning a drill template using a level.
Figure 28:
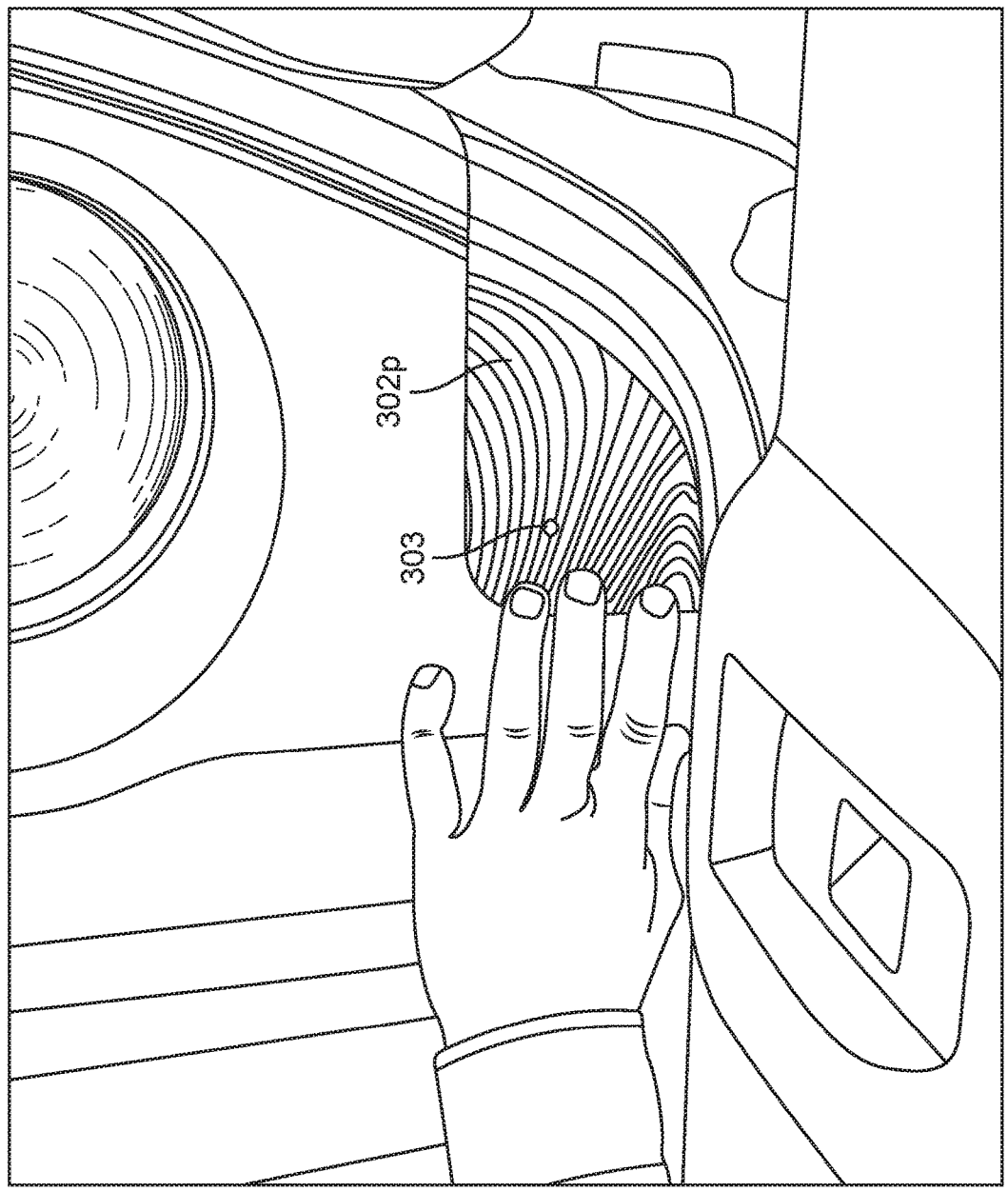
FIG. 28 is a perspective view of using making a mark on the grille locating the location of the hole to be drilled.
Figure 29:
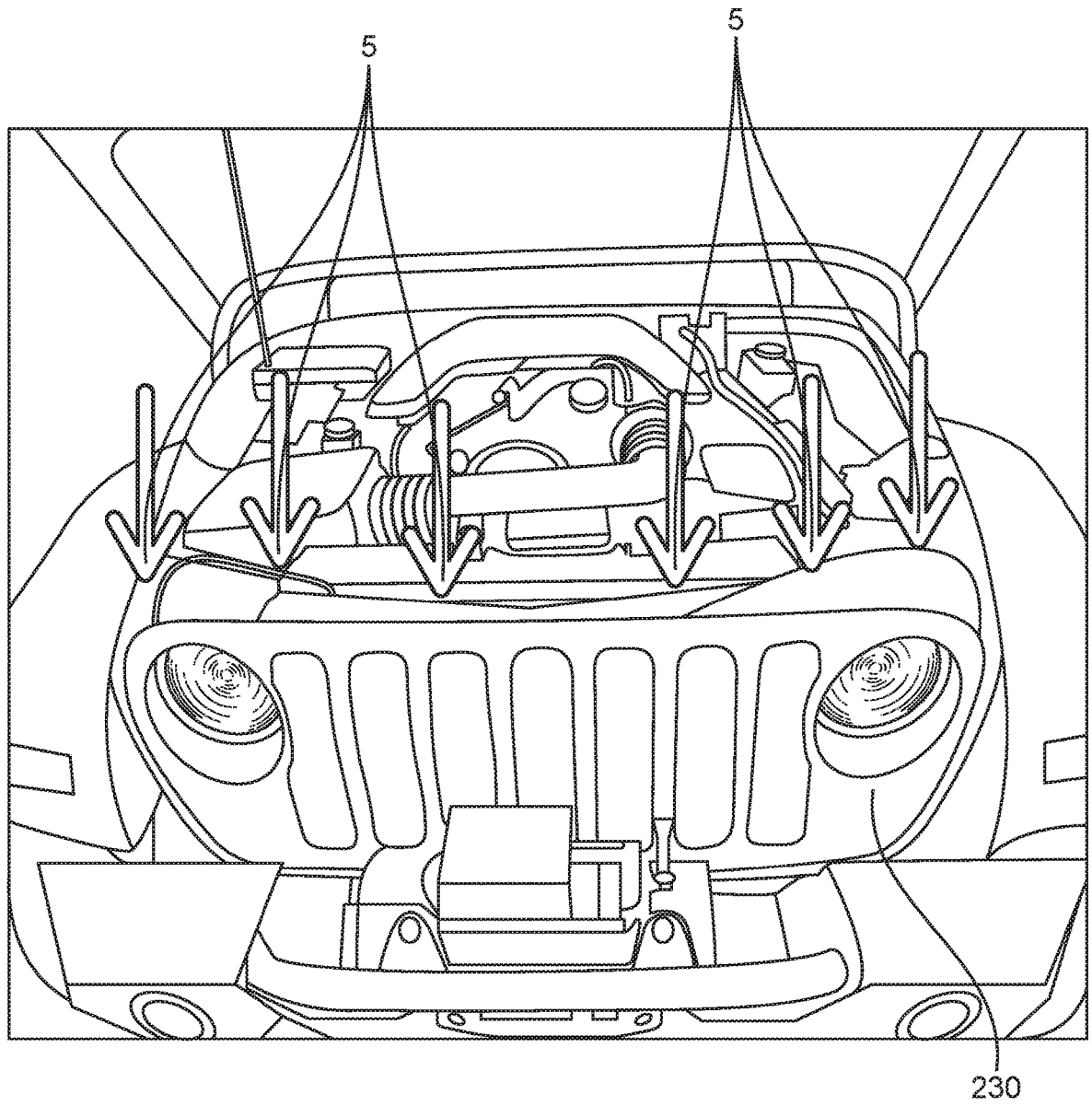
FIG. 29 is a front, perspective view of a vehicle indicating the location of six factory rivets that are to be removed.

FIGS. 27-35 illustrate the steps required to install the vehicle turn signal assembly onto the grille of a vehicle. As shown in FIG. 27, the users are instructed to place supplied drill template 302p on the passenger-side of the JEEP® grille as shown. Using a level 2 the users are instructed to make sure the grille template 302p is leveled and follows the body line of the grille. As shown in FIG. 28, the users are instructed that, once the template is leveled using a white marker, to mark the center hole in the template. Repeat these steps for other side.

As shown in FIG. 28, the users may employ a plastic clip removal tool (not shown) and are instructed to locate and remove six factory plastic rivets 5 as shown above. The user may set hardware aside for later use. Firmly grab and pull the lower corner of the factory grille. The users should work their way to the other side of factory grille, remove factory grille from vehicle, and set factory grille aside for later use.

Figure 30:
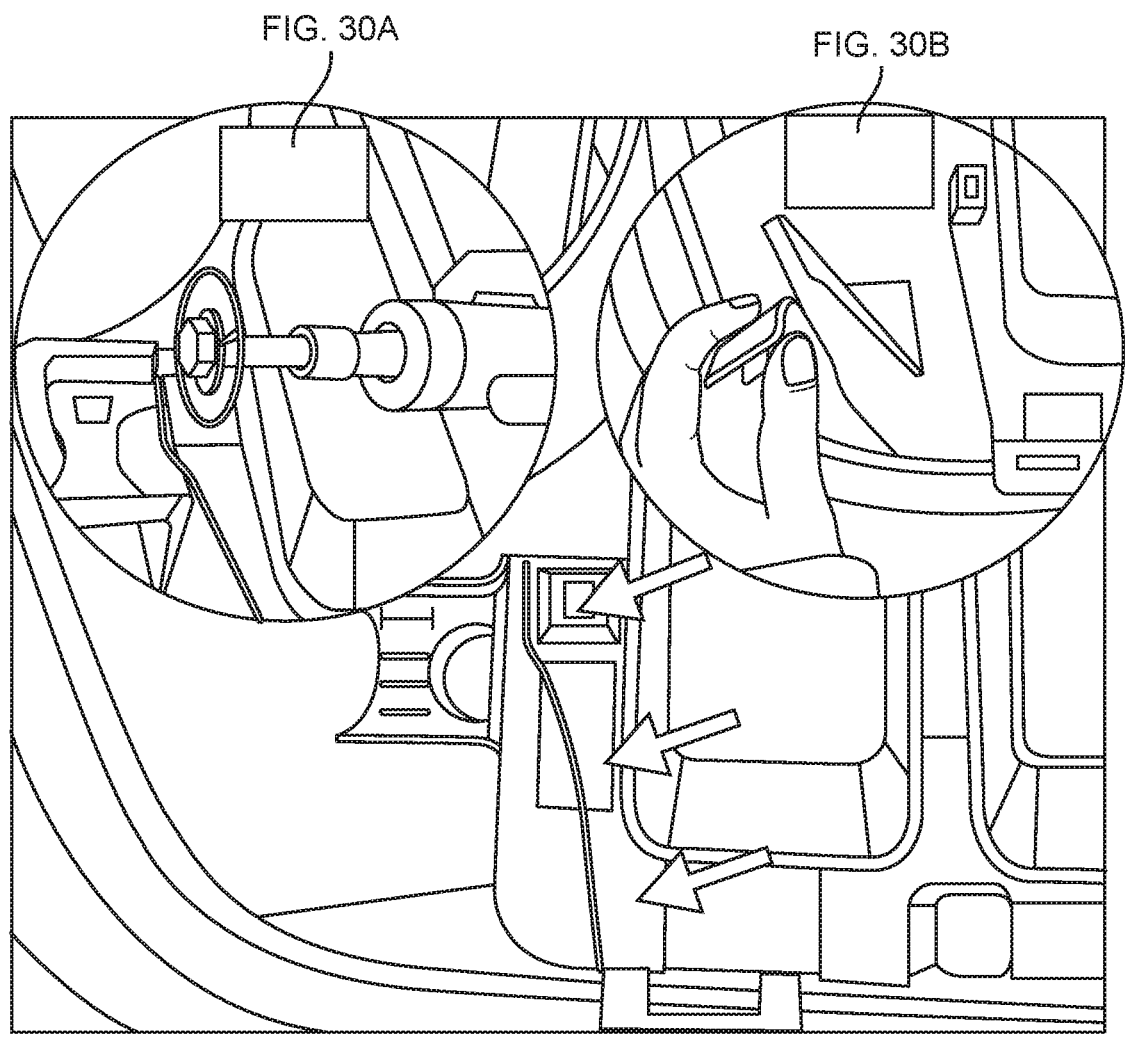

FIGS. 30, 30A, and 30B are perspective views of a user removing a plastic bracket for the grille. The users are instructed to place factory grill on work bench face side down. Using the marked area as a reference and using a rotary tool sold under the trademark DREMEL® for example or a knife sold under the trademark STANLEY® to cut the plastic bracket as shown in FIG. 30A. The users are cautioned to not cut through face of factory grille! Discard factory plastic bracket. As shown in FIG. 30B, the users are instructed to repeat step for other side of grille.

Figure 31:
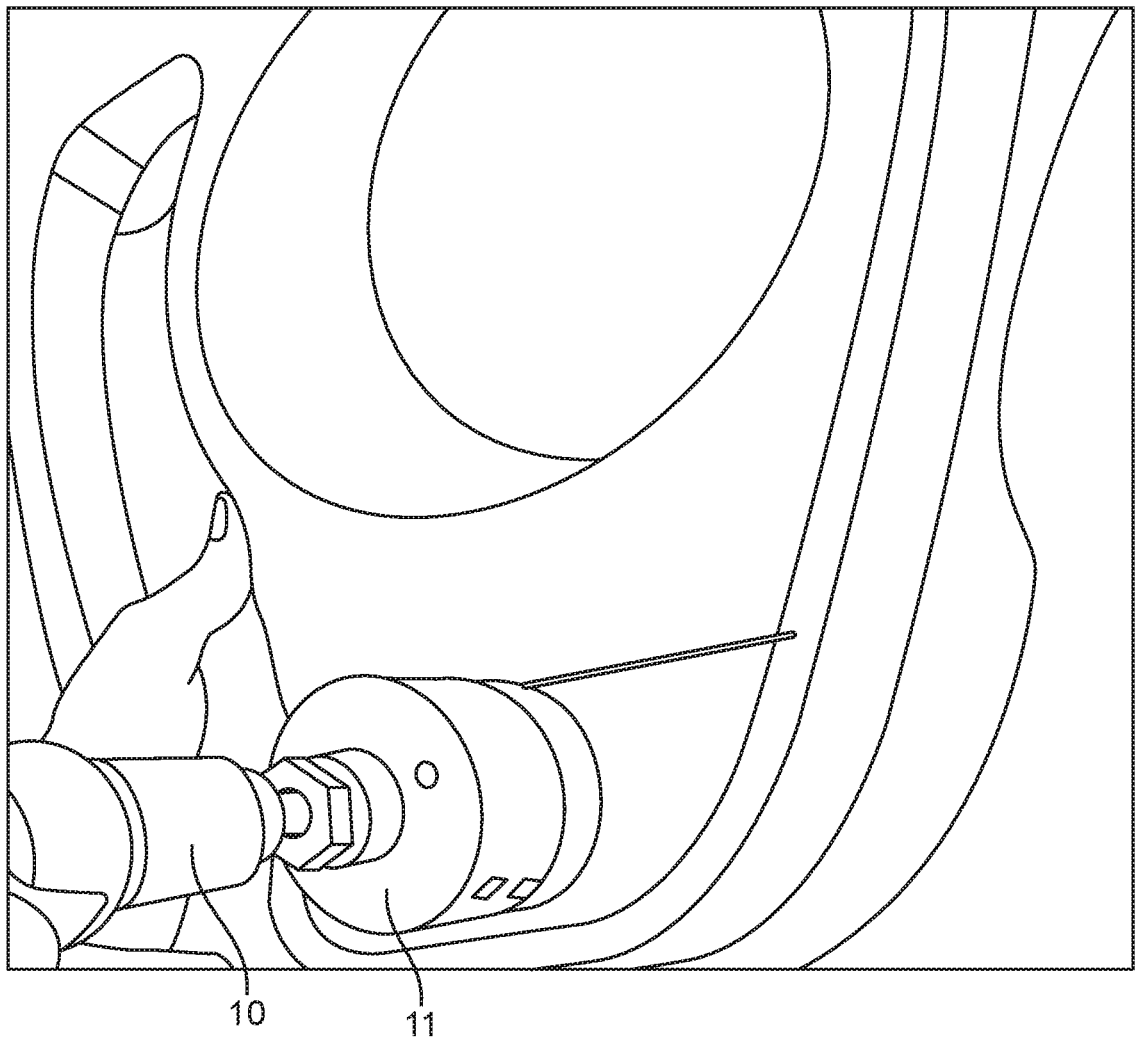
FIG. 31 is a perspective view of a user using a hole drill to drill a hole into the grille.

FIG. 31 is a perspective view of a user using a hole drill to drill a hole into the grille. Working in front of the grille, the users are instructed to drill a pilot hole in the mark previously applied as shown in FIG. 28. The users should fit a 3⅜" hole saw 11 into an electric drill 10. The users should place the center bit of the hole saw in the pilot hole and drill a hole through the factory grill. Repeat for other side. Using a Stanley knife or other suitable tool, the users should scrape away up any residue or plastic burrs left by the hole saw. Users are cautioned to not enlarge the hole as the turn signal housing fits tightly into the hole. This process is repeated for the other side.

Figure 32:
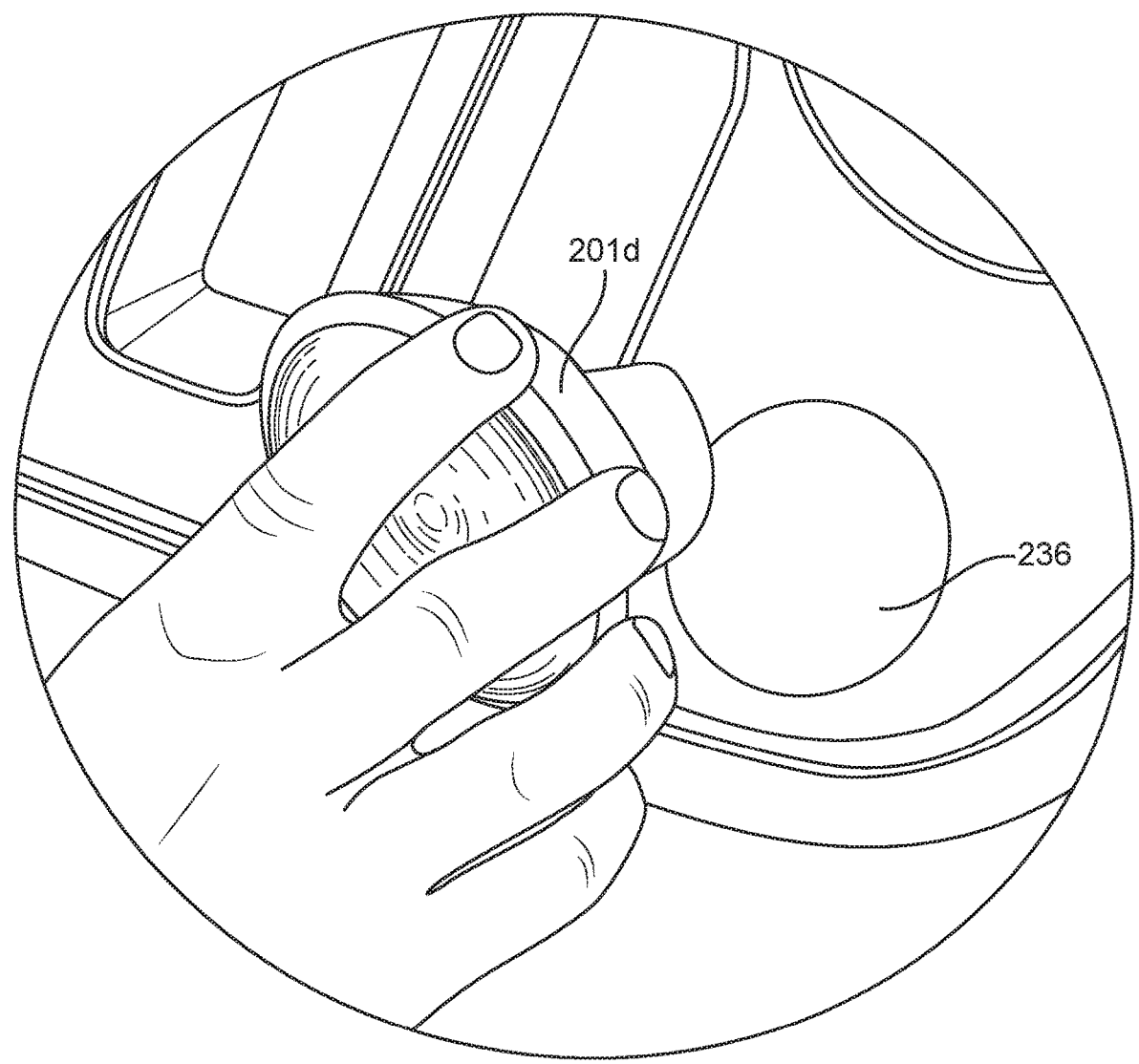
FIG. 32 is a perspective view of a user placing a turn signal housing into the drilled hole.
Figure 33:
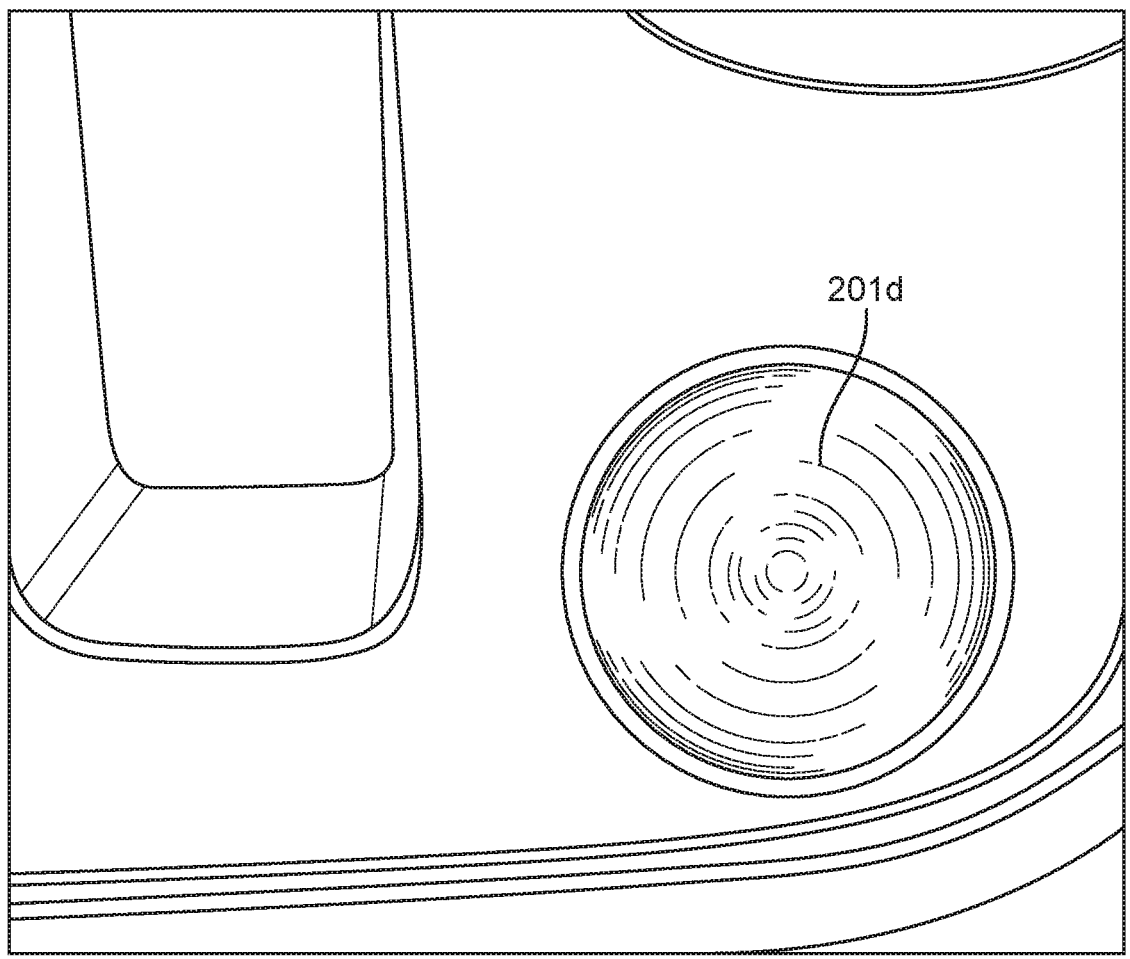
FIG. 33 is a perspective view of a turn signal assembly installed into the grille.

FIG. 32 is a perspective view of a user placing a turn signal housing into the drilled hole. With the grill on the work bench, the users are instructed to place your new passenger side light housing (B) onto the hole in grille as shown (make sure the arrow embossed in the turn signal light is pointing upwards). Firmly press down around the edges of the light housing until the lens sits flush against the factory grille as shown in FIG. 33.

Figure 34:
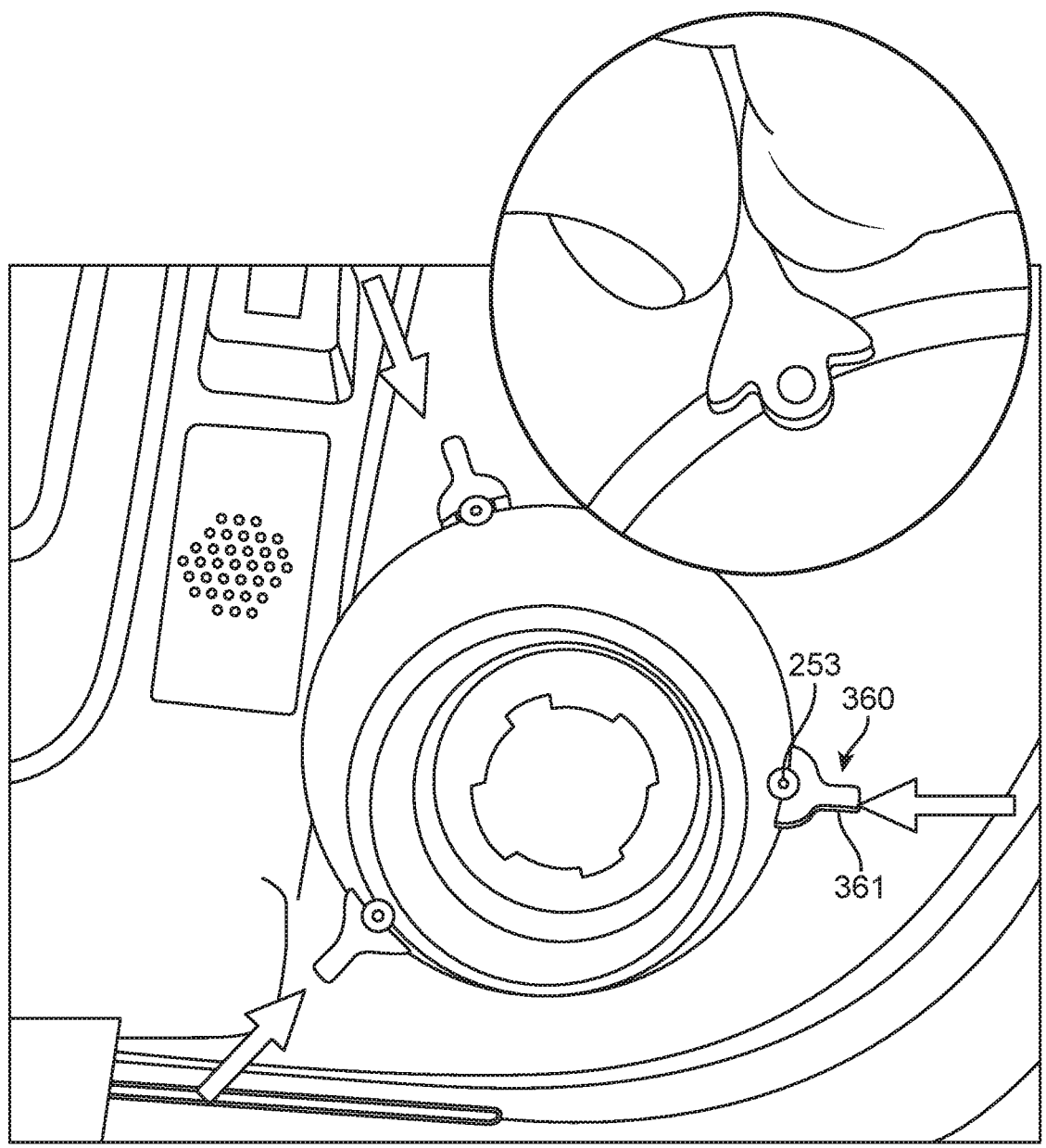
FIGS. 34 and 35 are views of the back of the grill showing the installation of the turn signal assembly onto the grille.
Figure 35:
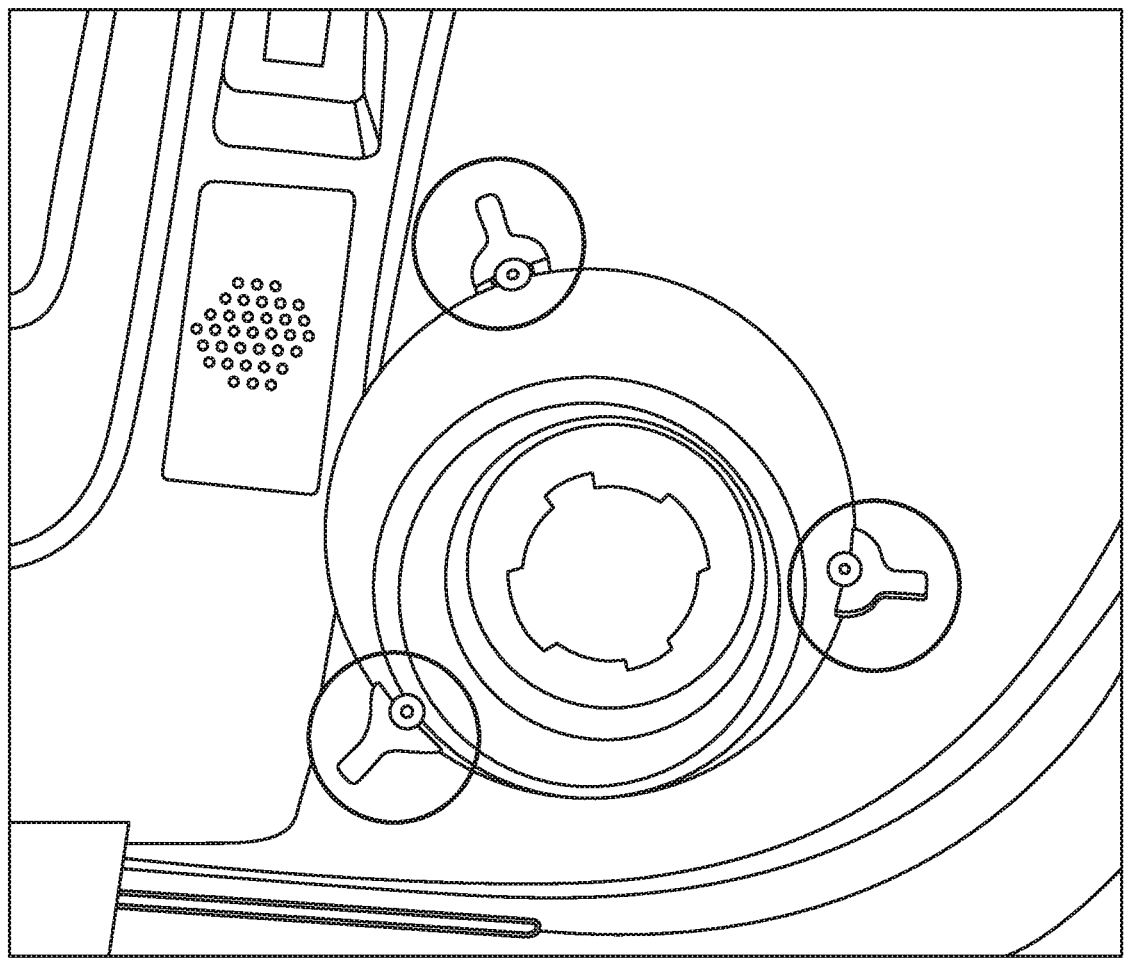

FIGS. 34 and 35 are views of the back of the grill showing the installation of the turn signal assembly onto the grille. The users are instructed that, while working behind the grille, to place supplied mounting tabs (C) over the boss in the turn signal housing. Line up the hole in the mounting tabs with the holes in the turn signal housing. Repeat step for the other 2 mounting tabs. The users should then place three supplied Philips head screws (D) through the holes in the mounting tabs and into the boss. The users should tighten down using a #2 Philips head screws. Repeat these steps for other side turn signal housing.

Figure 36:
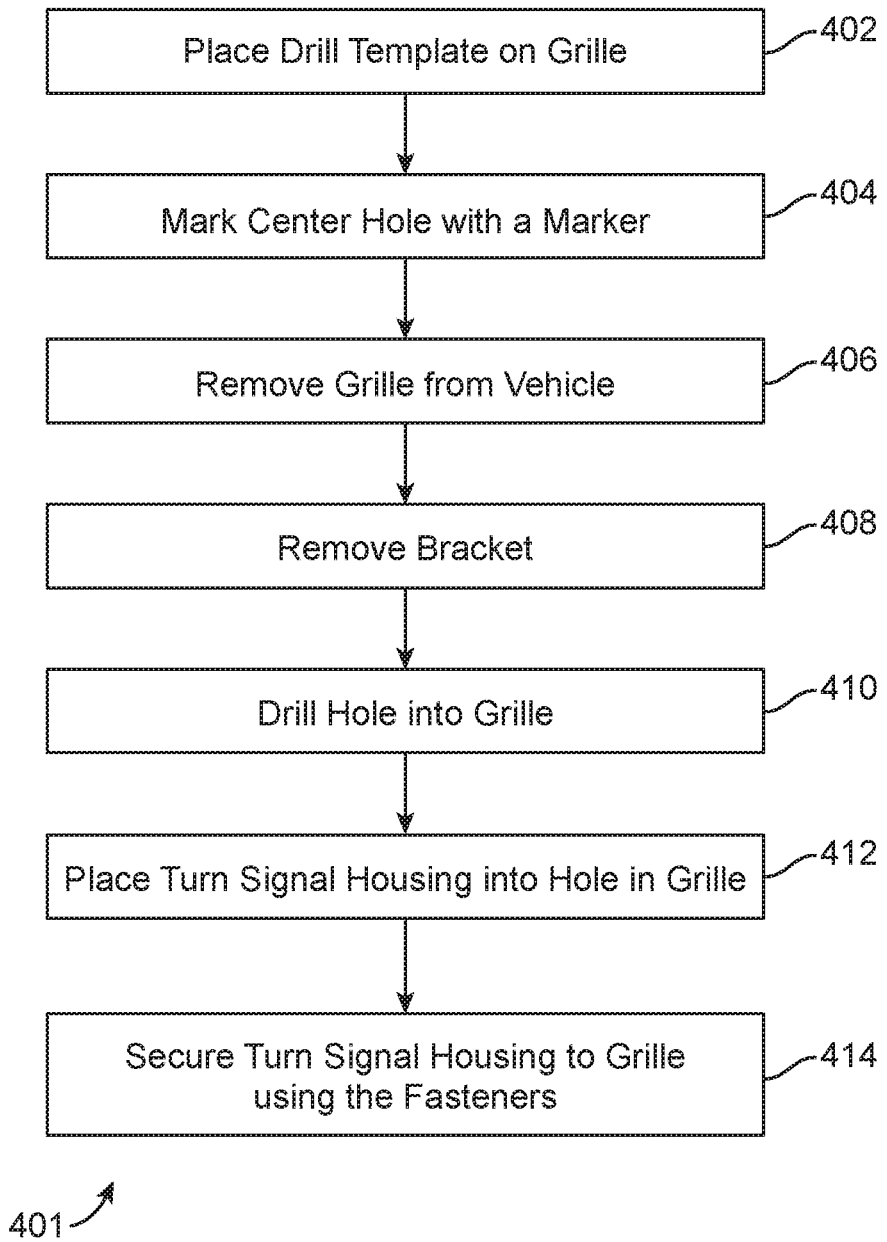
FIG. 36 is a flowchart of an exemplary method for installing an aftermarket turn signal onto a factory original grille.

FIG. 36 is a flowchart indicating an exemplary process or method retrofitting a vehicle turn signal assembly to a grille of a vehicle. The method comprises placing a drill template 302d/p on a grille 230 of a vehicle (step 402). As noted above and shown in FIG. 27, the users are instructed to place supplied drill template 302d or 302p on the JEEP® grille. Using a level 2, the users are instructed to make sure the grille template is leveled and follows the body line of the grille. The method further comprises marking the grille through the center hole with a marker (step 404). The grille is removed from the vehicle (step 406). The bracket on the rear surface of the grille is removed using a rotary tool or knife for example (step 408). A hole is drill into the grille using a hole saw for example (step 410). The user then places the vehicle turn signal housing 250 into the whole 236 of the grille 230 (step 412). The user then secures the vehicle turn signal assembly 201 using fasteners or washers 260 (step 414).

Although the invention has been discussed with reference to specific embodiments, it is apparent and should be understood that the concept can be otherwise embodied to achieve the advantages discussed. The preferred embodiments above have been described primarily as an aftermarket vehicle turn signal assembly and a method of relocating a turn signal to a grille of a vehicle. In this regard, the foregoing description is presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for relocating a factory original turn signal socket and associated wires from a fender to a grille of a vehicle, the method comprising:
   providing an aftermarket turn signal housing having a front portion with a lens, a center body, and a back portion with an aperture that is configured to receive and mechanically interface with a factory original turn signal socket that was factory installed on a fender;
   removing a grille from a vehicle, the grille having a front outward facing surface and a rear surface facing an engine compartment of the vehicle which contains vehicular structure;
   determining a location of a hole to be drilled in the grille for receiving the aftermarket turn signal housing, the hole being in alignment with a cavity in the vehicular structure that is capable of receiving the center body and back portion of the aftermarket turn signal housing;
   drilling the hole in the grille at the determined location;
   inserting the aftermarket turn signal housing into the hole in the grille so that the center body and back portion extend rearwardly therefrom;
   securing the aftermarket turn signal housing to the grille;
   relocating the factory original turn signal socket and associated wires from the fender to the grille by removing the factory original turn signal socket from the fender and inserting the factory original turn signal socket into the aperture on the back portion of the aftermarket turn signal housing without modifying an electrical connection between the factory original turn signal socket and the associated wires; and
   installing the grille on the vehicle with the center body and back portion extending rearwardly therefrom and received by the cavity in the vehicular structure.

2. The method for relocating a factory original turn signal socket of claim 1, wherein determining a location of a hole to be drilled comprises placing a drill template made for a specific vehicle onto the front surface of the grill.

3. The method of claim 1 further comprising removing a factory provided bracket from the rear surface of the grille in order to permit the hole to be drilled in the grille.

4. A retrofit vehicle turn signal assembly for attaching to an aftermarket opening formed in a grille of a vehicle, the retrofit vehicle turn signal assembly comprising:

a turn signal housing having a longitudinally spaced proximate front end and a distal rear end separated by a center body, the proximate front end having a circular light exiting opening with an annular lip extending radially outward from the proximate front end of the housing, the center body emerging longitudinally away from the proximate front end to distal rear end forming an internal cavity within the center body, the distal rear end having an aperture, wherein the internal cavity and the aperture of the distal rear end are shaped to receive and secure a light source, wherein the exterior of the proximate front end of the housing is sized to be received by an aftermarket opening formed in the grille of a vehicle formed as a circular through-hole in the grille of the vehicle;

a lens which at least partially covers the circular light exiting opening of the turn signal housing; and, one or more fasteners for securing the turn signal housing to a grille of a vehicle.

5. The retrofit vehicle turn signal assembly of claim 4, wherein the hole formed in the grille is located adjacent to a cavity of the vehicle engine compartment and is formed by manually drilling the hole through the grille.

6. The retrofit vehicle turn signal assembly of claim 4, wherein: a diameter of the hole of the grille is greater than a diameter of the exterior of the proximate front end and less than the diameter of the outer perimeter of the annular lip.

7. The retrofit vehicle turn signal assembly of claim 4, wherein the turn signal housing is secured to the grille by the fasteners urging and clamping the grille of the vehicle to the lip of the proximate end of the housing.

8. The retrofit vehicle turn signal assembly of claim 4, wherein the proximate front end and the adjacent regions of the center body further comprises:

one or more channels formed in the turn signal housing, for each channel, a post having a threaded hole formed near the perimeter of the proximate front end wherein the one or more fasteners each comprise
- a washer section having a protruding ear, the washer section having a through hole; and
- a screw placed through the hole in the washer section and coupling to the threaded posts.

9. The retrofit vehicle turn signal assembly of claim 4, wherein the lens is selected from a group consisting of: a clear lens, emitting the color the light source, or a yellow-amber lens, emitting a generally yellow-amber light.

10. The retrofit vehicle turn signal assembly of claim 4, wherein the light source is relocated from the original vehicle manufactured location to the turn signal housing attached to the opening in the grille.

11. The retrofit vehicle turn signal assembly of claim 4, wherein the retrofit vehicle turn signal assembly is designed for a sport utility vehicle.

12. A method for retrofitting a vehicle turn signal assembly to a grille of a vehicle, the method comprising removing a grille from a vehicle, the grille having a front outward facing surface and a rear surface facing an engine compartment of the vehicle;

removing a plastic bracket from the rear surface of the grille;

determining a location of a hole to be drilled;

drilling a hole into the grille;

placing a vehicle turn signal assembly onto the hole of the grille; and,

Securing the vehicle turn signal assembly to the grille.

13. The method for retrofitting a vehicle turn signal assembly to the grille of the vehicle of claim 12, wherein determining a location of a hole to be drilled comprises:

placing a drill template made for a specific vehicle onto the front surface of the grill;

aligning the drill template on the front surface of the grill so that the drill template is leveled and follows a body line of the grill; and, marking the location of the hole based on the location on the grille revealed by the aligned and leveled drill template.

14. The method for retrofitting a vehicle turn signal assembly to the grille of the vehicle of claim 12, wherein securing the vehicle turn signal assembly to the grille comprises securing fasteners to screw holes formed in the turn signal housing.

15. The method for retrofitting a vehicle turn signal assembly to the grille of the vehicle of claim 12, wherein placing a vehicle turn signal assembly onto the hole of the grille comprises:

identifying and selecting a turn signal assembly for a driver-side and passenger-side application; and, aligning the vehicle turn signal assembly based on positioning the assembly to point upwards based on indicia formed on the turn signal housing.

16. The method for retrofitting a vehicle turn signal assembly to the grille of the vehicle of claim 12, wherein the vehicle comprises a sport utility vehicle.

17. A retrofit vehicle turn signal assembly for attaching to an aftermarket opening formed in a grille of a vehicle, the retrofit vehicle turn signal assembly comprising:

a turn signal housing having a longitudinally spaced proximate front end and a distal rear end separated by a center body, the proximate front end having a light exiting opening, the center body emerging longitudinally away from the proximate front end to distal rear end forming an internal cavity within the center body, the distal rear end having an aperture, wherein the internal cavity and the aperture of the distal rear end are shaped to receive and secure a light source, wherein the exterior of the proximate front end of the housing is sized to be received by an aftermarket opening formed in the grille of the vehicle;

a lens which at least partially covers the light exiting opening of the turn signal housing; and, one or more fasteners for securing the turn signal housing to a grille of a vehicle.

18. The retrofit vehicle turn signal assembly of claim 17, wherein the proximate front end further comprises lip extending laterally outward from the proximate front end of the housing.

19. The retrofit vehicle turn signal assembly of claim 17, wherein the opening formed in the grille is located adjacent to a cavity of the vehicle engine compartment and is formed by manually drilling the hole through the grille.

20. The retrofit vehicle turn signal assembly of claim 17, wherein the lens is selected from a group consisting of: a clear lens, emitting the color the light source, or a yellow-amber lens, emitting a generally yellow-amber light.

21. The retrofit vehicle turn signal assembly of claim 17, wherein the light source is relocated from the original vehicle manufactured location to the turn signal housing attached to the opening in the grille.

22. The retrofit vehicle turn signal assembly of claim 17, wherein the retrofit vehicle turn signal assembly is designed for a sport utility vehicle.

* * * * *